US011040439B2

(12) United States Patent
Walker

(10) Patent No.: US 11,040,439 B2
(45) Date of Patent: Jun. 22, 2021

(54) HAND-HELD MACHINE TOOL COMPRISING A DRIVE MOTOR

(71) Applicant: Festool GmbH, Wendlingen (DE)

(72) Inventor: Nico Walker, Bohmenkirch (DE)

(73) Assignee: FESTOOL GMBH, Wendlingen (DE)

( * ) Notice: Subject to any disclaimer, the term of this patent is extended or adjusted under 35 U.S.C. 154(b) by 171 days.

(21) Appl. No.: 16/086,516

(22) PCT Filed: Apr. 10, 2017

(86) PCT No.: PCT/EP2017/058507
§ 371 (c)(1),
(2) Date: Sep. 19, 2018

(87) PCT Pub. No.: WO2017/178410
PCT Pub. Date: Oct. 19, 2017

(65) Prior Publication Data

US 2019/0091848 A1 Mar. 28, 2019

(30) Foreign Application Priority Data

Apr. 11, 2016 (DE) ........................ 102016106557.9

(51) Int. Cl.
*B25F 5/00* (2006.01)
*B25B 7/18* (2006.01)
(Continued)

(52) U.S. Cl.
CPC ................ *B25F 5/001* (2013.01); *B25F 5/00* (2013.01); *B25F 5/008* (2013.01); *B25F 5/02* (2013.01);
(Continued)

(58) Field of Classification Search
CPC .... B25F 5/001; B25F 5/00; B25F 5/02; B24B 7/184; B24B 7/18
(Continued)

(56) References Cited

U.S. PATENT DOCUMENTS 3,734,207 A * 5/1973 Fishbein ........... A61B 17/1622 173/217
3,802,075 A * 4/1974 Taylor .................... A01G 3/053 30/216
(Continued)

FOREIGN PATENT DOCUMENTS

DE 102007012394 A1 9/2008
DE 102008055797 5/2010
(Continued)

OTHER PUBLICATIONS

German Search Report dated Feb. 1, 2017.

*Primary Examiner* — Gloria R Weeks
(74) *Attorney, Agent, or Firm* — Hoffmann & Baron, LLP

(57) ABSTRACT

A hand-held machine tool, in particular a sanding machine, including a rod-type handle element for the user to grip and a processing head which is moveably mounted on the handle element by means of a joint assembly. The processing head has an electric drive motor for driving a tool holder provided for holding a processing tool and a speed-reducing gearbox between the drive motor and the tool holder, the gearbox being designed to achieve a reduction in speed of an output of the drive motor relative to a speed of the tool holder. The drive motor is a brushless motor and a power supply system for the drive motor is arranged at a distance from the drive motor on the handle element, the power supply system being connected to the drive motor by means of a cable arrangement.

25 Claims, 7 Drawing Sheets

(51) Int. Cl.
*B25F 5/02* (2006.01)
*B24B 7/18* (2006.01)
*B24B 47/12* (2006.01)

(52) U.S. Cl.
CPC ............... *B24B 7/184* (2013.01); *B24B 7/186* (2013.01); *B24B 47/12* (2013.01)

(58) Field of Classification Search
USPC ................. 30/277.4, 276, 321; 173/216, 217
See application file for complete search history.

(56) References Cited

U.S. PATENT DOCUMENTS 3,928,911 A * 12/1975 Pittinger, Jr. ...... A01D 34/4161 30/276
4,035,912 A * 7/1977 Ballas .................. A01D 34/416 30/276
4,052,789 A * 10/1977 Ballas, Sr. ........... A01D 34/416 30/276
4,291,502 A 9/1981 Grimsby et al.
4,386,540 A * 6/1983 Skaggs, Jr. ............... F16H 1/32 475/176
4,427,077 A * 1/1984 Hall .................... B25B 23/1456 173/183
4,501,332 A * 2/1985 Straayer ................. A01B 1/065 172/41
4,524,515 A * 6/1985 Oberg ................ A01D 34/4163 30/276
4,578,863 A * 4/1986 Laverick .............. A01D 34/416 30/276
4,654,971 A * 4/1987 Fettes ...................... A01G 3/08 30/296.1
5,174,099 A * 12/1992 Matsuura ............... A01D 34/76 56/12.1
5,181,369 A * 1/1993 Everts .................... A01D 34/78 30/276
5,199,501 A * 4/1993 Kluber ............... B23Q 11/0046 173/75
5,446,964 A * 9/1995 Woods ................. A01D 34/416 30/276
5,544,417 A * 8/1996 Atos .................. A01D 34/4165 30/276
5,933,966 A * 8/1999 Yates ..................... A01D 34/90 30/276
6,006,434 A * 12/1999 Templeton ............. A01D 34/90 30/276
6,076,265 A * 6/2000 Huang Lo .............. A01D 34/76 30/265
6,260,278 B1 * 7/2001 Faher ................... A01D 34/902 172/41
6,615,930 B2 * 9/2003 Bongers-Ambrosius .................... B08B 15/04 173/198
7,134,208 B2 * 11/2006 Wilkinson ........... A01D 34/902 30/276
7,484,300 B2 * 2/2009 King ........................ A01G 3/08 30/166.3
8,800,682 B2 * 8/2014 Walker .................... B24B 23/04 173/198
8,931,576 B2 1/2015 Iwata
9,472,992 B2 * 10/2016 Shaffer .................... H02K 5/08
9,872,429 B2 * 1/2018 Ma ....................... A01D 34/416
10,485,165 B2 * 11/2019 Yuan .................. A01D 34/4165
10,513,005 B2 * 12/2019 Kawakami .............. B24B 47/12
2004/0011543 A1 * 1/2004 Moore ............... B23Q 11/0046 173/198
2007/0193759 A1 * 8/2007 Sweig ................ B23Q 11/0046 173/198
2009/0140599 A1 * 6/2009 Yoshiyama ............ H02K 3/522 310/216.012
2010/0009608 A1 * 1/2010 Lo ........................... B24B 29/00 451/357
2011/0183587 A1 7/2011 Roscher
2011/0263373 A1 * 10/2011 Kume ........................ F16H 1/32 475/162
2011/0284256 A1 * 11/2011 Iwata ......................... B25F 5/00 173/176
2013/0031787 A1 * 2/2013 Kamiya ............... A01D 34/828 30/276
2013/0192862 A1 * 8/2013 Ceroll ................ B23Q 11/0046 173/198
2014/0231112 A1 * 8/2014 Schuele .................. B25F 5/008 173/1
2014/0259692 A1 * 9/2014 Racov ..................... B25F 5/008 30/277.4
2015/0013172 A1 1/2015 Shaffer
2015/0017891 A1 * 1/2015 Nordstrom .............. B24B 23/04 451/357
2015/0041167 A1 * 2/2015 Yamaguchi ............ H02K 11/33 173/46
2015/0263592 A1 9/2015 Kawakami et al.
2015/0280532 A1 10/2015 Mizutani et al.
2017/0059029 A1 * 3/2017 Sasaki ................. F16H 57/0486
2017/0234484 A1 * 8/2017 Vanko ........................ H02P 6/24 173/176
2019/0105755 A1 * 4/2019 Walker ...................... H02H 3/08
2019/0160622 A1 * 5/2019 Barth ...................... B24B 47/12
2019/0285143 A1 * 9/2019 Sasaki ........................ F16H 1/34

FOREIGN PATENT DOCUMENTS

| | | | |
|---|---|---|---|
| DE | 102008055797 | A1 | 5/2010 |
| DE | 102012020151 | | 4/2014 |
| DE | 202008018587 | U1 | 2/2016 |
| JP | 56-52166 | A | 5/1981 |
| JP | 2003305667 | A | 10/2003 |
| JP | 2011240441 | A | 12/2011 |
| JP | 2012035382 | A | 2/2012 |
| JP | 2013034403 | A | 2/2013 |
| JP | 2014023542 | | 2/2014 |
| JP | 15196223 | A | 11/2015 |
| WO | 2013/190682 | A1 | 12/2013 |
| WO | WO2014086873 | | 6/2014 |

* cited by examiner

HAND-HELD MACHINE TOOL COMPRISING A DRIVE MOTOR

This application claims priority based on an International Application filed under the Patent Cooperation Treaty, PCT/EP2017/058507, filed Apr. 10, 2017, which claims priority to DE 10 2016 106 557.9, filed Apr. 11, 2016.

BACKGROUND OF THE INVENTION

The invention relates to a hand-held machine tool, in particular a sanding machine, comprising a rod-shaped handle element for a user to grip and a machining head which is movably mounted on the handle element by means of a joint assembly, said machining head having an electric drive motor for driving a tool holder provided for holding a machining tool, and a speed-reducing gear unit between the drive motor and the tool holder, said gear unit being designed to achieve a reduction in speed of an output of the drive motor relative to a speed of the tool holder.

Such a hand-held machine tool in the form of a wall and ceiling sanding machine is, by way of example, described in DE 10 2007 012 394 A1. The drive motor is arranged on the machining head protruding in the direction of the handle element. Via a switch arrangement, it is possible to switch on, switch off and set the speed of the drive motor directly on the handle element.

However, this known drive concept has disadvantages in terms of the power and weight of the wall and ceiling sander.

SUMMARY OF THE INVENTION

Hence, the object of the present invention is to provide an improved drive concept for a hand-held machine tool of the abovementioned type.

To achieve this object, on a hand-held machine tool of the abovementioned type, it is provided that the drive motor is a brushless motor and a power supply system for the drive motor is arranged remotely from the drive motor on the handle element, the power supply system being connected to the drive motor by means of a line arrangement.

An advantage of this concept is that the brushless motor has an optimum power output at relatively low weight. It can also be optimally supplied with power by means of the power supply system in terms of power output and/or speed.

An advantage here is that a gear unit is arranged directly on the machining head, via which the tool holder is driven. The gear unit is a gear unit that reduces the speed of the drive motor, in particular a toothed gear unit. This allows the drive motor to rotate at a higher speed than the tool holder, the speed being reduced between the drive motor and the tool holder, wherein at the same time the torque of the tool holder increases. In this way, a smaller, more compact drive motor can be used, the torque of which is less than the torque developed on the tool holder.

Apart from the function of reducing the speed of the drive motor in relation to the tool holder, the gear unit can also perform other functions or comprise corresponding gear unit parts. Thus it is advantageously possible, by way of example, for the gear unit to comprise a gear unit generating a hypercycloid motion or overlaid rotational motions of the tool holder and/or an eccentric motion of the tool holder or to have corresponding gear unit parts. Consequently, therefore, by way of example an eccentric gear unit and/or a hypercycloid gear unit can be a component of the gear unit or be connected with the gear unit.

Alternative names for a brushless motor are an electronically commutated motor, or EC motor, or also a brushless DC motor (BLDC or BL motor). The brushless motor has no slide contacts or brushes. Between an exciter coil arrangement, which is fixed relative to the housing, or a stator of the brushless motor and the rotor of this, no electrical connections are necessary, by way of example slips rings, brushes or similar. Thus, there is no wear of the brushless motor or in any event significantly less than with a conventional universal motor or commutator motor.

At least one sensor can be arranged on the drive motor, by way of example a magnetic or optical sensor, for capturing a rotation angle position of the rotor relative to the stator or rotor position relative to the stator.

The power supply system comprises, by way of example, what is known as an electronic commutator.

The commutation is preferably sensor-free, meaning that on the drive motor itself or its exciter coil arrangement no sensors are necessary for capturing a rotor position, by way of example magnetic sensors for capturing the magnetic flow of the rotor, optical sensors or similar. No data line for transmission of sensor signals of a sensor, arranged directly on the drive motor, to the power supply system is necessary and/or provided either. If the power supply system and the drive motor are far away from one another, this allows a simplified cable arrangement.

But a sensor-driven or sensor-controlled commutation of the power supply system is perfectly possible as well. In this case, at least one sensor is then present on the drive motor, which captures a rotation angle position of the rotor in relation to the stator or the exciter coil arrangement and reports this via a data line to the power supply system as a data signal.

It is advantageous if the power supply system is arranged directly alongside or on a handle region for gripping the handle element by an operator. The power supply system can also, by way of example, be located between two handle regions, which are normally gripped by the operator, for example if the operator is guiding the hand-held machine tool with two hands or in a two-handed manner. The handle regions are advantageously provided on grip rod sections of a grip rod, between which the power supply system is arranged.

It is advantageous if the power supply system is arranged in a housing. The housing is, by way of example, arranged on a grip rod of the handle element.

The power supply system comprises, by way of example, an arrangement of a plurality of half bridges and/or a plurality of power electronics switches, by way of example MOSFETs or similar. The power supply system can also, by way of example, comprise an electrical transformer and/or other components for conditioning a mains voltage or a voltage from an energy storage device. In practice, such components can be quite heavy.

By arranging the power supply system on the handle element, a favourable centre of gravity results, meaning that a housing containing the power supply system can be gripped directly by the operator or is arranged near to a handle region that is normally used by the operator when operating and using the hand-held machine tool.

The hand-held machine tool expediently has a connection device for connection to an electrical energy supply network, in particular an alternating voltage network. During the conditioning of a supply voltage from the energy supply network, the power supply system, by way of example, converts the alternating voltage into an intermediate circuit direct voltage.

Alternatively, or additionally, it is also possible for the hand-held machine tool to have an energy storage device connection for an electrical energy storage device, for example a battery pack, a fuel cell, or similar. This allows the hand-held machine tool to be operated independently of a mains power supply.

A preferred concept provides that the line arrangement comprises for each phase of an exciter coil arrangement of the drive motor, in each case conductors or exactly one conductor. Thus, by way of example, for a three-phase exciter coil arrangement that is to be controlled a total of three conductors or exactly three conductors can be provided. A number of phases of the drive motor thus corresponds preferably exactly to a number of conductors of the line arrangement. But it is perfectly possible for the drive motor to also have just one or two phases or more than three phases, by way of example six phases. In this case, one conductor, two conductors or six conductors are then provided in the line arrangement. However, it is conceivable in any of the above configurations for an additional ground wire to be a component of the line arrangement and to serve as a return conductor for the current-carrying conductors provided for supplying power to the exciter coil arrangement. It is in any case advantageous if the line arrangement comprises just a few lines or conductors. This, by way of example, makes it easier to screen the line arrangement and/or contacts between sections of the line arrangement, if the handle element has multiple parts, by way of example handle elements that are detachable from one another and/or mounted movably in relation to one another.

Therefore, the line arrangement expediently comprises lines exclusively provided for supplying power to the drive motor.

It is preferable if the lines which supply the phases of the exciter coil arrangement with current, are screened by one or more electromagnetically-screening screening devices. By way of example, the lines run in an electromagnetically-screened hose or braid. It is perfectly possible to electromagnetically screen each of the lines individually. However, it is advantageous if a plurality of lines are screened together. But, individually-screened lines can also pass through a screening device jointly screening at least two lines. The at least one screening device protects the environment of the line arrangement from electromagnetic influences, and conversely the line arrangement from electromagnetic influences from the environment.

It is possible for the line arrangement to comprise at least one data line or that at least one data line runs between the machining head and the power supply system. Via a data line, by way of example, a sensor signal or a plurality of sensor signals from at least one sensor can be transmitted to the drive motor. The sensor signal can, by way of example, originate from a sensor which transmits a temperature and/or speed and/or rotational position of the drive motor or another functional variable of the drive motor to the power supply system. Such a data line can, by way of example, be a component of the line arrangement.

However, between the drive motor and the power supply system, expediently and preferably no data line is run that serves exclusively for data transmission and not for supplying power to the drive motor. Thus, the cable arrangement can, by way of example, be restricted to those current-carrying lines which are necessary for supplying power to the exciter coil arrangement. Thus, it is particularly preferred if no data line is necessary.

It is advantageously provided that the power supply system and the drive motor in each case have a cooling device, by way of example one or more fans. In this way, cooling of the power supply system is independent of cooling of the drive motor. The cooling devices work independently of one another so that, by way of example, the power supply system and the drive motor can be cooled individually and as required. The distance between power supply system and tool holder, which is next to the drive motor, advantageously means that, by way of example, dust, chips or similar resulting from use of the machine tool, cannot reach the power supply system directly such as to soil, by way of example, its cooling device or fans there. It is also advantageous if a fan propeller is arranged in a torsionally-rigid manner on the motor shaft of the drive motor. Thus, the drive motor drives its own fans, so to speak.

The distance between the power supply system and the machining head is preferably relatively large. This distance is, by way of example, at least two or three times the diameter of the machining head. Another way of achieving this large distance is if it is provided that the distance between power supply system and machining head is at least two or three times the length of the power supply system and/or its housing.

It is advantageous if the drive motor is arranged in a housing providing it with electromagnetic screening.

The hand-held machine tool advantageously has an energy storage device connection for an electrical energy storage device, by way of example a battery pack, and/or a connection device for connection of an electrical energy supply network of, by way of example, 220-240 V or 110-120 V or another alternating voltage network.

It is advantageous if an axis of rotation of the drive of the drive motor and an axis of rotation of the tool holder are parallel to one another. In this case, the gear unit does not have to perform an angular deflection, meaning that, by way of example, an inherently relatively loud angular gear unit is unnecessary. Gear unit components are also spared. But it is also possible for the axis of rotation of the drive and the axis of rotation of the tool holder to be oriented at a small angle to one another, by way of example, of a maximum of 10° or a maximum of 20° or a maximum of 30°.

It is particularly expedient if the drive motor protrudes upwards in front of an upper surface of the machining head facing away from the machining side of the machining tool.

A configuration is preferred in which the drive motor does not protrude to the side or transversally to the axis of rotation of the tool holder beyond a machining surface, by way of example a sanding surface, polishing surface or similar. It is also expedient if the drive motor does not protrude transversally to the axis of rotation of the tool holder, beyond a cover, by way of example a protective hood or extraction hood, for the machining tool.

The drive motor is expediently arranged outside of a centre of gravity or centre of the machining head. The drive motor is preferably arranged off-centre, so to speak, on the machining head.

It is advantageously provided that the drive motor is arranged alongside at least a pivot axis of the joint assembly on the machining head. This pivot axis is preferably a pivot axis running transversally to the longitudinal axis of the handle element. This can help provide the machining head with greater mobility in relation to the handle element. An advantageous arrangement provides that the pivot axis, alongside which the drive motor is arranged, runs between the drive motor and a line arrangement connected to the machining head.

It is also possible for the drive motor to be arranged in a plane of another pivot axis of the joint arrangement, by way of example a pivot axis running transversally to the above-mentioned pivot axis, in particular at right angles. By way of example, the longitudinal axis of the handle element is also provided in this plane.

An independent invention in connection with the preamble of claim 1, but also an advantageous development of the measures to date is represented by the following:

The drive motor is preferably arranged in a motor housing on which at least one protection body is provided for damping a mechanical shock impacting on the motor housing. In front of the motor housing, alternatively or additionally, at least one hoop guard can be arranged to protect the motor housing from mechanical loading. In this way, the drive motor or its motor housing is advantageously protected from shocks and other mechanical influences.

The protection body can, by way of example, be an impact absorber.

The protection body expediently comprises an elastic material, by way of example an elastic plastic material and/or rubber.

The protection body preferably has a ring-shaped design.

The protection body is expediently arranged on an area of the motor housing facing away from the machining head. By way of example, it is designed and provided there in the form of a protective collar, a protective ring or similar. The protection body is preferably designed as a plug-in component detachable from the motor housing, which can be plugged into a socket opening of the motor housing. A socket opening is accordingly arranged on the motor housing. It is advantageous if a clamping and/or interlocking of the protection body to/with the motor housing also exists, meaning that clamping and/or catch means are provided. If necessary, the protection body can be easily exchanged, by way of example for a more elastic protection body or an undamaged protection body.

It is expediently provided that on the drive motor a protective circuit is arranged with at least one electrical disconnector for isolating a connection between at least one electrical line of the line arrangement and a phase that can be supplied with current via this line of an exciter coil arrangement of the drive motor.

A basic concept here is that a disconnector is provided locally on the drive motor, able to electrically deactivate an electrical line of the line arrangement. The power supply system can thus supply the exciter coil arrangement with current without special monitoring, so that the rotor can rotate the drive motor. However, if there is a fault with the drive motor, by way of example overheating or similar, the disconnector disconnects the current supply of this one phase, associated with the disconnector, locally and directly on the drive motor, such that the drive motor is protected. Clearly, not just one, but also a plurality of disconnectors, can in fact be present. By way of example, between two lines that are separate from one another and the separate phases of the exciter coil arrangement supplied by them, a switch can be provided in each case. Thus, each of these phases can be isolated or electrically disconnected from the line supplying it by a disconnector.

A possible expediently provided data line or sensor line from the drive motor to the power supply system, via which faults with the drive motor can be reported to the power supply system, is unnecessary.

The concept works very quickly, meaning that the respective disconnector actively switches and/or disconnects the power supply for the phase associated with it well before any destruction of or damage to the drive motor. There is no risk of time delays due to the power supply system having to detect a fault with the drive motor and then disconnect the power supply.

At least one of the disconnectors or the disconnector is preferably a thermally operable switch, which isolates the line from the phase of the exciter coil arrangement associated with it, as a function of a predetermined temperature. Thus, if the drive motor is in danger of overheating the disconnector disconnects the power supply for the phase associated with it. The thermally operable switch comprises, by way of example, a bimetal switch. This advantageously comprises a bimetal element, which directly connects electrical contacts of the disconnector with each other, or separates them, and/or has at least one electrical contact.

However, the disconnector can also be an electrically operable switch or comprise such a switch, which in the event of exceeding a predefined voltage and/or a predefined current flow, isolates the line from its associated phase. By way of example, the switch captures a current flow through a coil of the coil arrangement, which is supplied with current by the line, or a current flow in the line itself. The switch can also capture a voltage such that, by way of example, in the event of an overvoltage beyond a predetermined value, the switch isolates the line and the phase associated with it from one another.

Clearly, a combination of switches is also possible to form the disconnector, or a disconnector can be provided having various functions such as, by way of example, being thermally and electrically operable. Various functional switches can, by way of example, be connected in series, such that on the line or phase to be monitored various types of faults will bring about a disconnection, i.e. both in the case of overheating (thermal disconnection) and also, by way of example, in the case of an electrical hazard situation (disconnection/isolation in the case of excess voltage or excess current).

It is possible for the disconnector to be connected not just between a line and the phase associated with it, but between two or further lines and the phases associated with them. Thus, in this design, the disconnector is preferably designed to isolate electrical connections between at least two electrical lines of the line arrangement and the phases of the exciter coil arrangement that can be supplied with current via these lines. Thus, the disconnector has, by way of example, electrical contact pairs, one contact pair of a connection in each case being connected between an electrical line and the phase of the exciter coil arrangement supplied via this line An arrangement with two or more disconnectors is also possible which, by way of example, are connected in series or in a row one behind the other and between the line and the phase associated with it. With two or more phases of the exciter coil arrangement, such series connections of disconnectors are perfectly possible.

As already mentioned, a plurality of disconnectors may also be operable differently. By way of example, an arrangement of two or more disconnectors comprises a disconnector which is operable by a first physical, by way of example thermal, influence, whereas the other disconnector is operable by a second physical influence (current, voltage or similar).

It is preferred if the at least one disconnector is arranged on a stator, by way of example a laminated core of the drive motor. An arrangement of the disconnector immediately on the exciter coil arrangement of the drive motor would also be possible, by way of example to capture a current flow or a voltage. But through the arrangement directly on an exciter coil, overheating can be captured very quickly by the disconnector.

A preferred concept provides that the at least one disconnector is arranged in a protective housing. Consequently, the disconnector is, by way of example, protected from mechanical damage. The protective housing can have multiple parts, meaning that, by way of example, it has a housing base and a housing cover, such that it can be easily opened and closed. The housing parts of the protective housing are preferably interlocked or interlockable. The protective housing, preferably has a chamber in which the disconnector is fully accommodated, i.e. encased on all sides. But the protective housing can also be a partial housing which, by way of example, covers the disconnector, wherein the disconnector is preferably secured by one side directly to the drive motor, by way of example the stator of this.

The protective housing expediently has two housing parts, by way of example a thermally conductive housing part and/or an insulating housing part, between which the disconnector is arranged. The thermally conducting housing part is arranged on the drive motor, while the thermally insulating housing part is provided on a side of the protective housing facing away from the drive motor. In this way, by way of example, heat from the drive motor is directed to the disconnector accommodated in the housing. Heat from the outside, which might otherwise cause an undesired triggering of the disconnector, that is to say possibly operate the disconnector for isolating the connection between the conductor and the phase of the exciter coil arrangement, is thus kept away from the protective housing.

It is also advantageous if the disconnector, in particular the protective housing, is thermally and/or electrically insulated on a side facing away from the drive motor. By way of example, the protective housing has an appropriate thermally insulating plastic material there. It is also possible to create such a thermal or electrical insulation without a protective housing. By way of example, an over-moulding or a cover with a suitably insulating plastic on the isolation switch could act as thermal and/or electrical insulation.

An advantageous concept provides that between the at least one disconnector and an electrical or mechanical component of the drive motor, by way of example the stator or exciter coil arrangement of this, a heatsink is arranged. The heatsink is, by way of example, designed as a cushion or as a pad. The heatsink is, by way of example, arranged with full or substantially full surface coverage between the protective housing and the mechanical component of the drive motor.

It is preferred if the disconnector is loaded by a spring arrangement, by way of example a spring, in the direction of a component, by way of example of the stator, of the drive motor. Thus the disconnector is pushed by the spring arrangement, by way of example for a thermally optimum transmission, in the direction of the stator or the other component.

As already mentioned, a heatsink can be provided between the disconnector and the drive motor. It is preferred if this or another compensating means is provided for creating a substantially full surface contact between the disconnector and a component, by way of example of the stator, of the drive motor.

It is preferred if the power supply system has a current monitoring device for detecting a current flow on the line connected with at least one disconnector. So, if the disconnector, by way of example, isolates the current flow between this line and the phase of the exciter coil arrangement, no further current flows.

It is advantageous if the power supply system is designed for disconnecting further lines, in particular all lines between the power supply system and the drive motor, as a function of a current flow over the line connected with the at least one disconnector. So if, by way of example, the current monitoring device detects that current is no longer flowing through the line, which has been disconnected by the disconnector, to the stator or the exciter coil arrangement, it also disconnects the other lines. It is advantageous if the power supply system then disconnects completely when the disconnector goes to the isolated position.

The power supply system has, by way of example, a microprocessor controller able to respond to such operating states. A microprocessor of the microprocessor controller executes, for example, program code of a control program for controlling the power supply system.

It can also be provided that the power supply system, by way of example by means of a switching behaviour of electronic switches of its commutation device, detects that the at least one disconnector has entered the isolated position, and has thus isolated the phase of the exciter coil arrangement associated with it from the line associated with it.

It is expediently provided that an exciter coil arrangement of the drive motor has a plurality of exciter coils, wherein the electrical disconnector forms the sole disconnector arranged on the drive motor for isolating a connection between the power supply system and the drive motor and/or on the drive motor no further disconnector for isolating a connection between the power supply system and the drive motor is arranged.

The drive motor advantageously has a stator with an exciter coil arrangement and a rotor with a motor shaft, having an output for driving a tool holder.

A fan propeller is expediently connected in a torsionally rigid manner, or with a rotary coupling, with the motor shaft, wherein the motor shaft on its longitudinal end regions is rotatably supported by a drive bearing arranged in the area of the output and a motor bearing arranged at the other longitudinal end region, so that it can rotate with respect to the stator.

It is preferably provided that the exciter coil arrangement is arranged between the fan propeller and the output of the motor shaft and the fan propeller is designed to generate a cooling air flow for the drive motor flowing from the fan propeller to the output.

The advantage of this concept is that the fan propeller forms a component of a pusher fan or represents a pusher fan, i.e. the air is sucked in from the side facing away from the tool holder and then, so to speak, pushed through the stator in order, in particular, to cool the exciter coil arrangement. The cooling air is drawn from a, so to speak, relatively clean area, i.e. one in which relatively small amounts of chips, dust and so on, are present, so that soiling of the motor is significantly less or even avoided.

It is also advantageous with this concept that the drive motor, by way of example, requires only two bearings, namely a drive bearing in the vicinity of the output and a motor bearing remote from this. At the same time, the motor bearing forms a bearing for the section of the motor shaft which is rotatably coupled to the fan propeller or secured in a torsionally rigid manner to the fan propeller. The drive bearing can be in the vicinity of a gear unit, such that no further bearing is needed there to support the motor shaft.

In principle, it is conceivable for the drive to directly drive the tool holder.

However, a concept with a gear unit is preferred. It is expediently provided that the output for driving the tool holder has a rotary coupling with a gear unit, which drives the tool holder. The gear unit is, or comprises, a toothed gear unit, in particular a bevel gear unit and/or a gear unit that reduces or increases a speed of the drive motor in relation to the tool holder.

Through the arrangement of the drive motor between the fan propeller and the gear unit, by way of example seals and/or bearings can be spared.

It is advantageous if the gear unit contributes to the enclosing or dust protection of the drive motor and/or is itself sealed against dust. Both contribute to reduced wear of the hand-held machine tool.

The gear unit expediently forms an enclosed module. A preferred measure provides, by way of example, that the gear unit is arranged in an enclosed gear unit housing in particular sealed against dust. The gear unit housing has, by way of example, housing parts or housing walls, which delimit an interior space of the gear unit housing, in which the moving components, by way of example toothed wheels, bearings, or similar, are protectively accommodated. Only at the interfaces to the outside, where the output of the drive motor is arranged, or an output for the tool holder and the tool holder itself, are openings present. These openings can also be advantageously sealed by enclosed or dust-tight bearings. A seal arrangement between the housing parts of the gear unit housing, in particular a seal with an O-ring, can form an additional seal of the gear housing.

It is also advantageous if a wall is arranged between the gear unit and the stator of the drive motor and sealed in respect of the cooling air flow. So, the cooling air flow does not flow from the drive motor into the gear unit. The wall can—as will become clear later—by way of example be formed by a cover of the motor housing. The wall can also be formed by a housing wall of the gear unit housing. Combinations are possible. It can be provided that a housing wall of the gear unit housing and a cover or cover wall of the motor housing are positioned next to and/or on top of one another and form the wall between gear unit and stator.

It is advantageous if between the gear unit, by way of example its gear unit housing, and the drive motor there is no gap or fan propeller. Consequently it is thus advantageous if the front face of the drive motor directly abuts the gear unit, in particular the gear unit housing of this.

A particularly compact arrangement is where the output of the drive motor forms a drive wheel, by way of example a drive pinion of the gear unit. The drive wheel can, by way of example, be in the form of teeth arranged directly on the motor shaft or arranged indirectly on the motor shaft.

It is expedient if a gear unit housing of the gear unit has an insertion opening for the output of the drive motor. On the insertion opening or other connection between the output and the gear unit housing, a seal for the output is expediently arranged. This allows the output to have a dust-tight connection with the gear unit.

It is preferably provided that the motor housing has outflow openings for the cooling air flow arranged between the drive bearing and the exciter coil arrangement. In this connection it can be advantageous if exclusively such outflow openings are present, meaning that in the longitudinal direction in front of the drive bearing no outflow opening is present.

It is particularly preferred if outflow openings for the cooling air flow are arranged exclusively between the drive bearing and the exciter coil arrangement. These outflow openings preferably have a radial arrangement and/or design in relation to the motor shaft. The cooling air flow thus flows from the motor bearing in the direction of the drive bearing, but not directly past this which, by way of example, helps reduce or avoid soiling or other impairment of the drive bearing.

It is preferred if the outflow openings as a whole, or at least one outflow opening is or are arranged and/or designed for the outflow of the cooling air flow radially in relation to the motor shaft. Consequently, the cooling air flow does not flow, or not just, axially along the longitudinal axis of the motor shaft out of the motor housing, but radially outwards.

It is preferred if the at least one outflow opening or all outflow openings for outflow of the cooling air flow is or are directed towards a working area of the hand-held machine tool, so that the cooling air flow flowing out of at least one outflow opening or the outflow openings freely blows across the working area at least in part. It is preferred if the outflow openings or the at least one outflow opening is or are directed in the working direction of the hand-held machine tool. It is also advantageous if the cooling air flow can blow freely laterally to the working area. By way of example, the outflow openings extend over an angular range on the motor housing such that the cooling air flow can blow freely through the working area both directly in the working direction ahead of the hand-held machine tool, and in an angular range of, by way of example, 10-40° laterally to a centre line directed forwards in the working direction. It is particularly advantageous if the outflow openings have an arched arrangement about the motor shaft, in particular in a circumferential region of 30-180° of the motor housing.

It is advantageous if the outflow openings are radially remote from an outer periphery of the stator. By way of example, outflow openings arranged on the motor housing are at a distance from the outer periphery of the stator which corresponds to at least a half radius, preferably approximately a whole radius, from the outer periphery of the stator to the motor shaft. The space saved in this way between stator and outflow openings or motor housing can, by way of example, be used for electric cables, protective circuitry and similar. These are simultaneously cooled.

A particularly easy to implement bearing concept provides that the fewest possible bearings are needed for the drive motor. By way of example, it is advantageous if the motor shaft is supported by precisely two bearings and/or by means exclusively of the motor bearing and the drive bearing. In this case, no further bearings are present. It is particularly advantageous if the fan propeller does not have to be supported by a separate bearing, but is arranged directly on the motor shaft and supported by the motor bearing. By way of example, the fan propeller is not arranged between the motor bearing and a further support. However, it is perfectly possible that for the fan propeller at least one bearing is provided in addition to the motor bearing.

It is preferable if the rotor is supported in a rotor receptacle of the stator, which at at least one longitudinal end region of the motor shaft, expediently both longitudinal end regions of the motor shaft, is dust-tight or sealed against the environment.

By way of example, a labyrinth seal can be provided between the stator and the rotor. By way of example, a flow labyrinth is present between the rotor and the stator, so that the cooling air cannot flow, or only insignificantly, into a gap between rotor and stator.

It is also advantageous for sealing the rotor receptacle space if the drive bearing and/or the motor bearing are arranged on a bearing cover and the bearing cover itself and/or the respective drive bearing or motor bearing held by the bearing cover seals the rotor receptacle of the stator, in which the rotor is accommodated, preferably in a dust-tight manner. Thus a combination is perfectly possible, meaning that both the bearing cover and the respective bearing create an impermeability. Furthermore, the abovementioned labyrinth seal can be provided between rotor and stator. A bearing cover is, by way of example, understood to be a cover on the face of the rotor receptacle, to which the longitudinal axis of the motor shaft runs at an angle. The bearing cover can be an integral part of the stator body of the stator, meaning that the rotor receptacle, by way of example, is designed as an indentation on the stator body. At least one of the bearing covers is preferably designed as a component mounted on the stator body.

An advantageous concept provides that the drive bearing and/or the motor bearing are configured as sealed or dust-tight bearings. By way of example, suitable gaskets or sealing rings are provided. It is also an advantage if the drive bearing or the motor bearing or both, provide a seal, in particular a dust-tight seal for the aforementioned rotor receptacle in which the rotor is accommodated within the stator. Consequently, both bearings or one of the bearings, advantageously contribute or contributes, to the dust-tightness of the rotor receptacle.

It is expedient if the air flowing into the motor housing to the drive motor, is filtered. It is preferably provided that the motor housing, in the area of the fan propeller, by way of example on a housing cover provided there, has an inflow opening, on which a mounting for detachable mounting of a filter element is arranged. The filter element serves to filter air flowing through the inlet opening. By way of example, the filter element comprises a paper filter and/or a filter grid and/or a filter fabric or similar. On the inlet opening, additionally or alternatively to the filter element, an inlet grille, by way of example comprising a plurality of ribs can also be provided. The inlet grille can serve as a support for the filter element.

The mounting expediently comprises a mounting clip, with which the filter element can be retained. The mounting clip can be an integral part of the filter element.

It is also expedient if the mounting comprises catch means for engaging with the motor housing.

The motor housing preferably forms a machine housing of the hand-held machine tool. The motor housing or machine housing is preferably, so to speak, the most external or the external component. Consequently, the machine housing is not accommodated in an additional housing, enclosing it. By way of example, the motor housing is a machine housing of a machining head of the hand-held work tool.

It is expediently provided that in the motor housing a flow housing or an air routing body, or both, is or are arranged for routing the cooling air. The flow housing or the air routing body are, by way of example, sleeve-like. The stator is preferably accommodated at least partially in the flow housing or air routing body. The flow housing or the air routing body are preferably provided so that the cooling air passes on the outer periphery of the stator or the exciter coil arrangement.

At this point it is mentioned that the exciter coil arrangement preferably has air channels to allow air to pass between its exciter coils.

The hand-held machine tool preferably has a grip rod with a longitudinal axis or comprises such a grip rod, wherein in the connection area with the end region of the handle element the suction hose runs along this longitudinal axis. A flexible suction hose may, by way of example, be arranged on the grip rod. But it is also possible for the handle element to have a rigid tubular body, in which a suction channel having a flow connection with the suction hose runs to the machining head. The tubular body can, by way of example, have the design of a section tube, in particular a rigid section tube. In this case, the tubular body is suited to grasping by the operator. Consequently, the section tube forms a support body or a weight-bearing component of the handle element.

The handle element expediently has at least one suction channel, running in the direction of a longitudinal axis of the handle element, and opening out at its end region of the handle element facing towards the machining head on the front face from the handle element. There the suction hose is connected with the suction channel towards the machining head.

However, it is preferred if the handle element at least on its end region facing towards the machining head is designed as a suction pipe or has a suction pipe. The suction hose leading to the machining head is connected to this suction pipe.

The hand-held machine tool is preferably a sanding machine, polishing machine or milling machine. The hand-held machine tool is particularly preferably equipped with a handle element, protruding from the machining head or motor housing.

The handle element can be made in a single part or multiple parts. Preferably, the handle element is or comprises a grip rod. The grip rod can be a single-part component or have multiple rod sections, that can be separated from one another and/or are movable in relation to one another by means of bearings, so that, by way of example when not in use, the grip rod can be disassembled and/or compactly folded.

BRIEF DESCRIPTION OF THE DRAWINGS

In the following, an exemplary embodiment of the invention is described using the drawing. This shows as follows.

DETAILED DESCRIPTION

Figure 1:
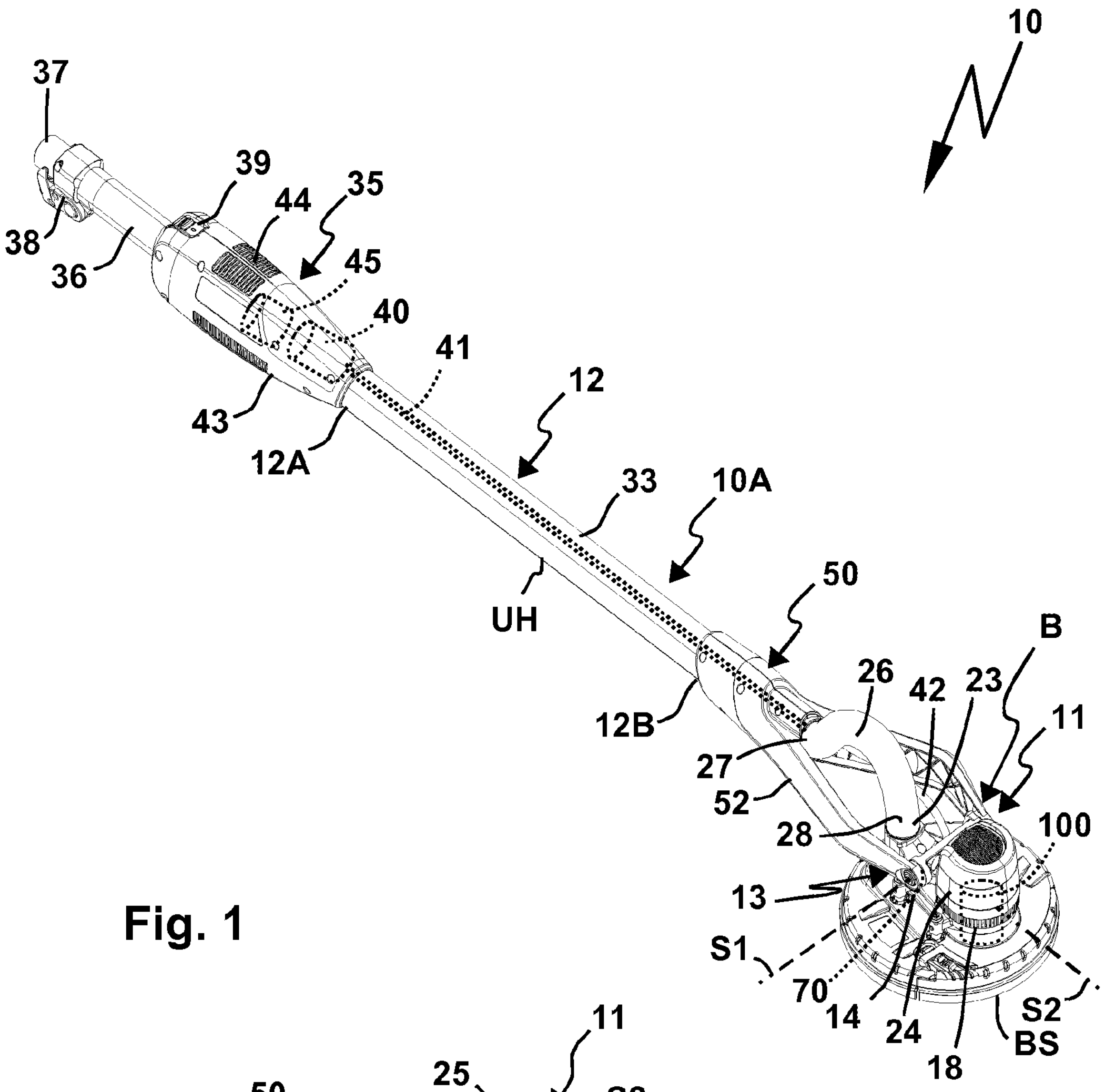
FIG. 1 A perspective view of a sanding machine.
Figure 2:
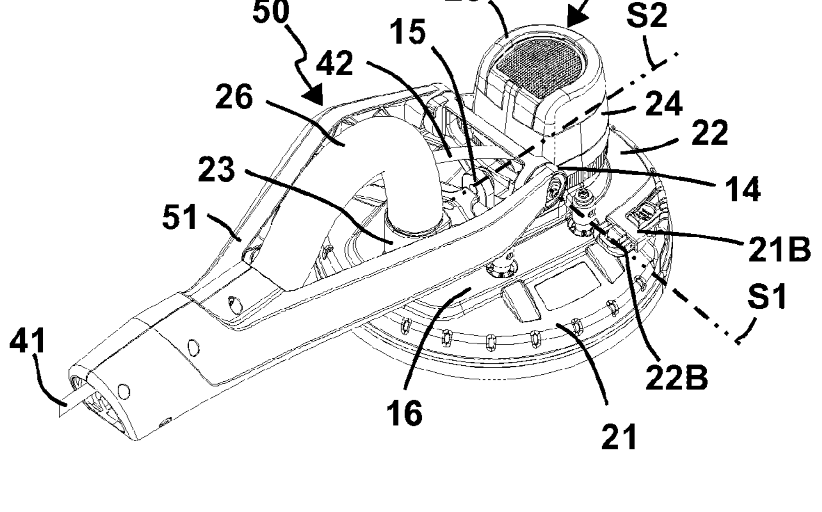
FIG. 2 A perspective view of the machining head, by way of example a sanding head, of the sanding machine in FIG. 1.

The exemplary embodiment relates to a hand-held machine tool 10 in the form of a sanding machine, wherein in respect of many partial aspects of the following description, however, other embodiments of hand-held machine tools are also possible, by way of example milling machines, polishing machines or similar. Furthermore, in the exemplary embodiment an elongated handle element is shown, which can in fact be shorter or longer. The hand-held machine tool according to the drawing is advantageous for the machining of ceilings or walls. The hand-held machine tool 10 according to the drawing can also be referred to as a ceiling and/or wall sanding machine. Aspects of the following designs do not necessarily relate exclusively to sanding machines, polishing machines or milling machines, but can also have applications in other hand-held machine tools.

The hand-held machine tool 10 has a machining head 11, supported in an articulated manner on a handle element 12 by means of a joint assembly 13, but in the present case not so that it can move by sliding, which would in principle be possible, but at least about a pivot axis, in the specific exemplary embodiment even about two pivot axes. The handle element 12 has a rod-shaped design. It has a longitudinal extension or longitudinal axis L. The longitudinally-extended handle element 12 allows the machining head 11 to be guided at a large distance from the user along a workpiece surface O of a workpiece W, by way of example a wall surface.

The joint assembly 13 supports the machining head 11 in relation to the handle element 12 by means of a first pivot bearing 14 pivoting about a first pivot axis S1 and by means of a second pivot bearing 15 pivoting about a second pivot axis S2. By means of the pivot bearings 14, 15 the machining head 11 is able to pivot relative to the handle element 12 about both pivot axes S1 and S2, wherein the pivot axes S1 and S2 are at right angles to one another. In principle it is not just right angles that can be considered, though. The pivot bearings 14, 15 advantageously form a gimballed support.

The pivot axis S1 runs transversally, in the present case transversally at right angles, to the longitudinal axis L of the handle element 12. The pivot axis S2 and the longitudinal axis L are advantageously arranged in a common plane or in planes parallel one another. The pivot axis S2 and the longitudinal axis L do not intersect in the present case.

The machining head 11 has a support body 16, on which a drive motor 17 is held. The drive motor 100 drives a tool holder 19 directly, or in the present case via a gear unit 80, about an axis of rotation D. The tool holder 19 is provided for holding a machining tool 20, which in the mounted state on the tool holder 19 can be driven by the drive motor 100 in a rotary motion. The tool holder 19 comprises, by way of example, a socket opening, bayonet contours, a screw thread or similar other assembly means known per se for mounting a machining tool.

However, at this point it is mentioned that instead of, or in addition to, the rotary motion of the tool holder 19, by way of example, an oscillating motion is also possible in another design of an exemplary embodiment. Furthermore, superimposed rotary motions, by way of example hypercycloidal rotational motions, of the tool holder 19 are possible, wherein then the gear unit 80 has a correspondingly different design, by way of example having an eccentric gear unit.

The machining tool 20 is in the present case a sanding machine, in particular a sanding plate. The machining tool 20 can contain a plurality of components, by way of example a sanding plate on which a sanding disc or a sanding sheet can be arranged. For this purpose, by way of example, a Velcro fastening between the sanding plate and the sanding sheet is advantageous.

By means of the machining tool 20 designed as a sanding tool, the hand-held machine tool 10 forms a sanding machine 10A. The machining head 11 could also be referred to as a sanding head. The longitudinally-extended, rod-shaped handle element 12 makes it easier to machine surfaces that are remote from the operator, by way of example wall surfaces. The hand-held machine tool 10 preferably forms a wall and/or ceiling sanding machine. However, the designs described in the following are also advantageous for a number of differently-designed hand-held machine tools, in particular sanding machines, but also saws, drills or similar.

The tool holder 19, and consequently the machining tool 20, when it is secured to the tool holder 19, are preferably arranged below a cover of the machining head 11. It would be possible, for example, for the cover 21 to cover the machining tool 20 across its entire outer periphery and upper surface. In the present case a cover 22 which is movable in relation to the cover 21, is provided by way of example on a front, free area of the machining head 11 and facing away from the handle element 12. The cover 22 is, for example, removable from the cover 21 and/or supported by means of a support on the cover 21 so that it can move, by way of example about a pivot axis parallel to the pivot axis S2. A plug-in assembly of the cover 22 on the cover 21 provides, by way of example, for pluggable projections 22B, for example plug-in flaps, which can be plugged into the socket openings 21B of the cover 21, and in particular are lockable with the socket openings 21B.

On the outer edge region of the cover 21, 22 a seal 22A, thus sealing elements, for example brushes, sealing lips or similar other sealing elements preferably adapted to the workpiece surface O, can be provided for. It is possible that the machining tool 20 protrudes beyond the seal 22A.

The cover 21, 22 is, by way of example, secured to a bottom side of the base plate or the support body 16 or is an integral part of the support body 16. On an upper surface, thus facing away from the tool holder 19, on the support body 16 a motor housing 24 for the drive motor 100 and a suction connection 23 are arranged.

On the upper surface of the motor housing 24 facing away from the tool holder 19, an air inlet or inlet opening 25 is arranged for admission of the cooling air for cooling the drive motor 100. The cooling air K flows out of the motor housing 24, by way of example, via an air discharge region 18 of this. By way of example, the air discharge region 18 is positioned in an area provided at an angle to the inlet opening 25, by way of example on the outer periphery of the motor housing 24. It would in principle be possible for the cooling air K to flow as far as the area enclosed by the covers 21, 22 and to contribute there, by way of example, to the cooling of the machining tool 20 or also to removal of dust.

The air discharge region 18 extends both in a working direction AR forwards, and laterally thereto, by way of example via an angular area of in each case approximately 90° laterally to the working direction AR. The cooling air K can thus blow freely across a working area AB extending forwards in the working direction AR and laterally to the working direction AR.

Via the suction connection 23, dust, dirt or chips can be extracted from the area covered or overlapped by the covers 21, 22. The suction connection 23 has, by way of example, a nozzle 23A.

A suction hose 26 with a hose end 28 is connected to the suction connection 23, the other hose end 27 of this being connected to the handle element 12.

The connection of the hose ends 27, 28 to fixed structures, for example the suction connection 23 and the handle element 12, is improved by structures 29, for example ribs, on the hose elements 27, 28. For securing the hose end 28 to the suction connection 23, a clamp 30 is, by way of example, provided for, which by means of a screw 30A can be brought into a clamping position which clamps the hose end 28 to the nozzle 23A. On the other hose end 27, by way of example a sleeve-shaped connecting piece 31 and a coupling 32 for connection with a rod-shaped channel body 33 of the handle element 12 are provided for, so that a dirt-charged suction flow S flowing out of the suction connection 23 is able to flow in a flow channel 34 of the handle piece 33.

At opposing longitudinal end regions 12A and 12B of the handle element 12 a handle section 35 and on the other side the machining head 11 are arranged.

The rod-shaped, elongated channel body 33 extends between the joint assembly 13 and the handle section 35 of the handle element 12. The handle section 35 is arranged between the channel body 33 and a channel body 36, on which a suction connection 37 for connection of a suction tube C is provided. The suction tube C can, by way of example, be connected by means of a securing arrangement 38 with the channel body 36. The securing arrangement 38 comprises, by way of example, a hose clamp, a hook arrangement or similar.

On the handle section 35 a switch 39 is arranged for switching on the drive motor 100.

In the area of the handle section 34 a power supply system 40 is arranged for supplying power to an exciter coil arrangement 120 of the drive motor 100.

Via a mains lead N which, by way of example, is arranged on the suction tube C or can be incorporated in the suction tube C, the power supply system 40 can be connected to an electricity supply system V or other power source. The other power source may, by way of example, be a battery pack or other energy storage device that can be on-board the hand-held machine tool 10.

Via diodes D1, D2, D3 and D4 of a rectifier G, the power supply system 40 can, by way of example, from an alternating voltage provided by the supply system V, generate in a known fashion a direct voltage UG versus ground or a base potential of U0, wherein between the potentials UG and U0 advantageously a capacitor C1, by way of example a smoothing capacitor or intermediate capacitor, is arranged.

An output stage E, e.g. a commutator, is connected to lines with the potentials U1, U0, which via conductors L1, L2 and L3 provides excitation currents 11, 12 and 13 for the drive motor 100. The output stage E comprises, by way of example, switch pairs with power electronics switches, by way of example MosFETs, V1, V2 and V3, V4 and V5, V6 between which the conductors L1, L2 and L3, respectively, are connected in the manner of half bridges.

The switches V1-V6 are triggered by a controller 170 via control lines (not shown). The controller 170 monitors, by way of example by means of a current monitoring device 171, the current flow on conductor L1. Other current monitoring devices could in fact also be provided, by way of example for conductors L2 and L3. The current monitoring device 171 has, by way of example, an appropriate inductance for recording the current flow on conductor L1.

The controller 170 expediently comprises a control program 173, comprising a program code executable by a microcontroller 172 of the controller 170. By executing this program code, the controller 170 can trigger the switches V1-V6 appropriately, in order that through an appropriate current flow on conductors L1 to L3 a speed and/or power output of the drive motor 100 can be set. But the switching behaviour of the switches V1-V6 can be an indicator for the controller 170 that current is no longer flowing via one or more of the conductors L1 to L3.

The line arrangement 41 comprises an electric cable 42, in which the conductors L1, L2 and L3 are arranged. The cable 42 runs, starting from the handle section 35, in the channel body 33 or outside the channel body 33 and emerges from the channel body at its end region facing away from the machining head 11. From there the cable 42 runs freely as far as the drive motor 100.

On the handle section 34, a housing 43 is provided in which a power supply system 40 is arranged. Apart from the power electronics components, the power supply system 40 expediently also has mechanical components, for example cooling means. Consequently the power supply system 40 weighs a certain amount, but this does not hamper operation of the hand-held machine tool 10. This is because the power supply system 40 is arranged directly on the handle section 34, where the operator generally grips the handle element 12 with at least one hand. Consequently, in respect of the electrical drive technology, only the drive motor 100 acts in the sense of a lever on the handle section 34, whereas the current conditioning so to speak for the drive motor 100, is located with a favourable centre of gravity directly in the handle area of the handle element 12.

The arrangement of the electronics which are comparatively sensitive or sensitive to dirt or dust in the handle section 34 also has the advantage that it is as far away as possible from an area of the hand-held machine tool 10, where dust occurs, namely on the machining head 11. Consequently, by way of example through air flowing in through inlets 44 in the housing 43, which is preferably particularly further conveyed by cooling means, such as for example a fan 45, due to the large distance from the machining tool 20 there is less loading from dust.

Figure 3:
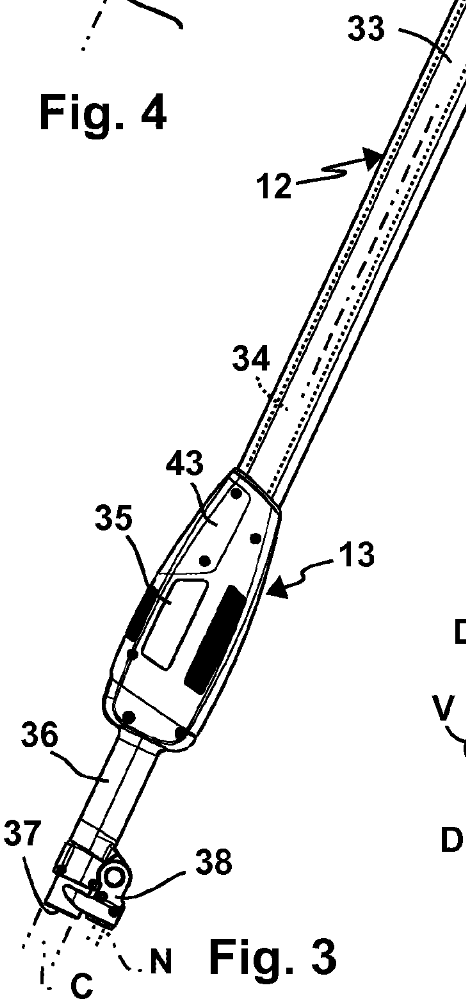
FIG. 3 A side view of the sanding machine with a machining head in a base position with, in FIG. 4 a partial view of a first displacement position shifted from the base position, and in FIG. 5 a partial view of a second displacement position shifted from the base position.

A contribution to the ease of handling of the hand-held machine tool 10 is made by the drive motor 100 and the suction connection 23 being arranged on opposite sides of an articulated-connection region 46 of the machining head 11, wherein the joint assembly 13 is flexibly connected at the articulated-connection region 46 with the machining head 11. Between the free ends of the handle element 12, where it is connected with this, and the machining head 11, the suction hose 26 has curved sections, in particular two curved sections 47, 48 curving in different directions, so that it comfortably follows the movements of the machining head 11 relative to the handle element 12. This is clear from FIGS. 3, 4 and 5.

The tool holder 19 is arranged on a machining side BS of the machining head 11. In a base position B of the machining head 11 relative to the handle element 12, the machining side BS and a bottom side UH of the handle element 12 face towards the workpiece W.

Figure 4:
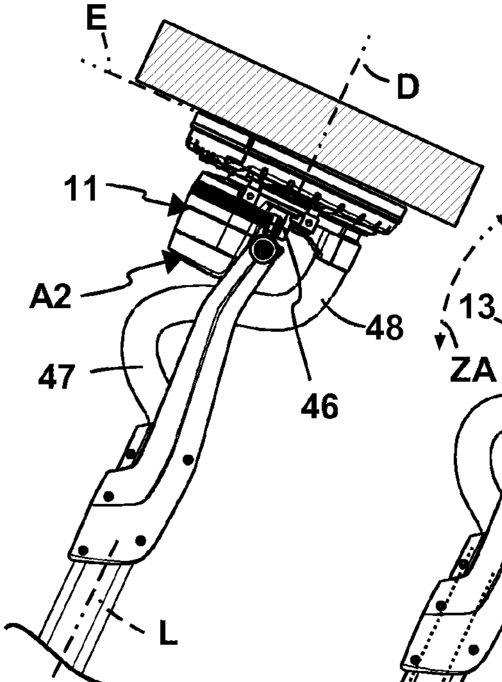
Figure 5:
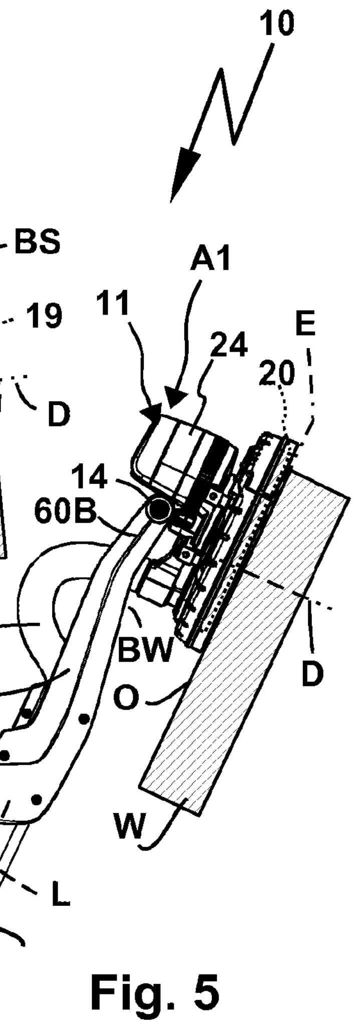
Figure 15:
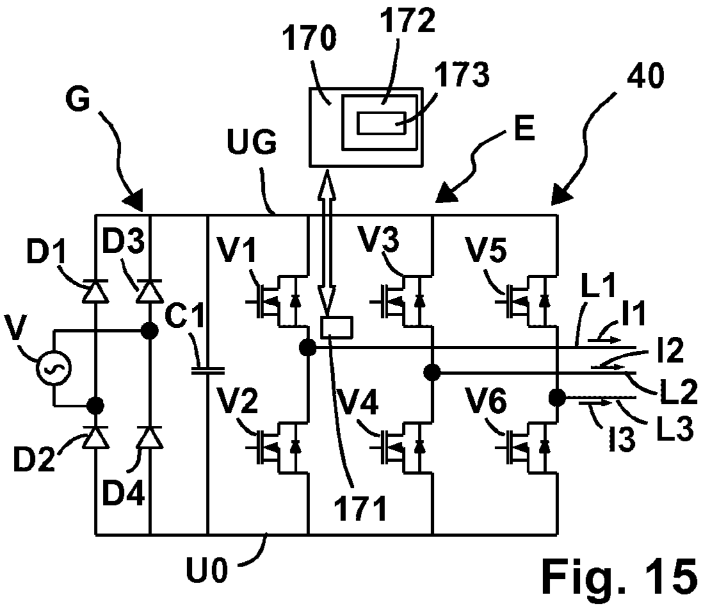
FIG. 15 A control circuit for the drive motor.
Figure 6:
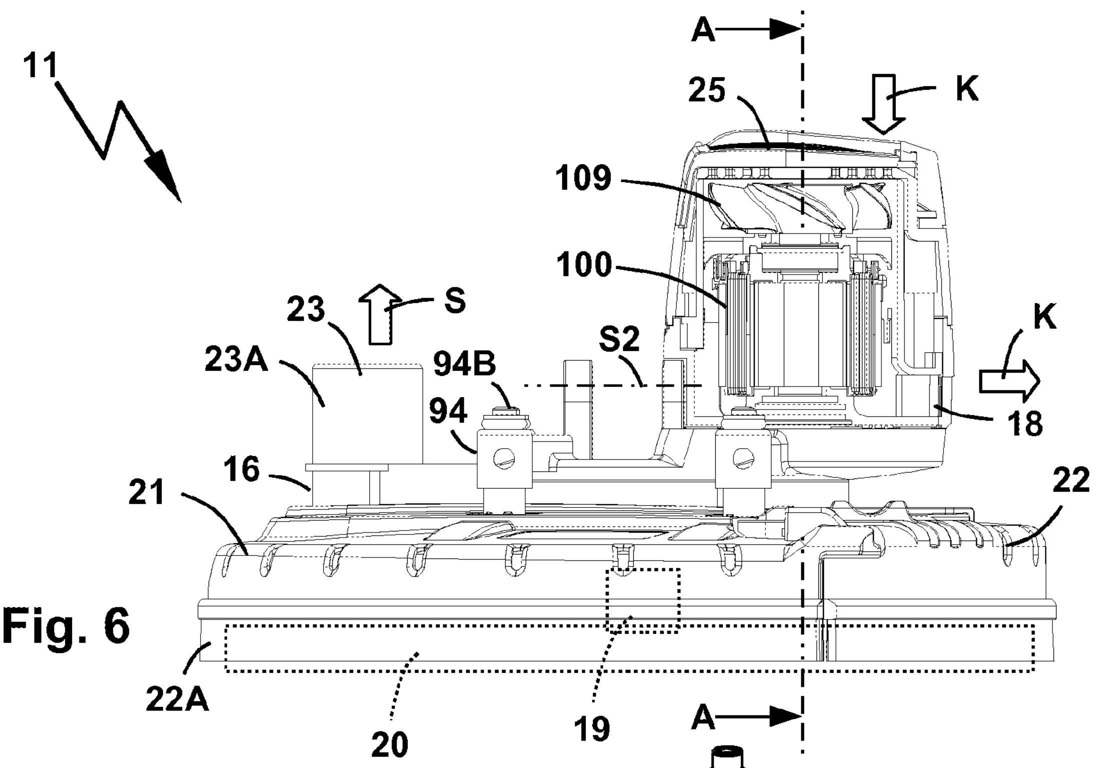
FIG. 6 A side view of the machining head.
Figure 7:
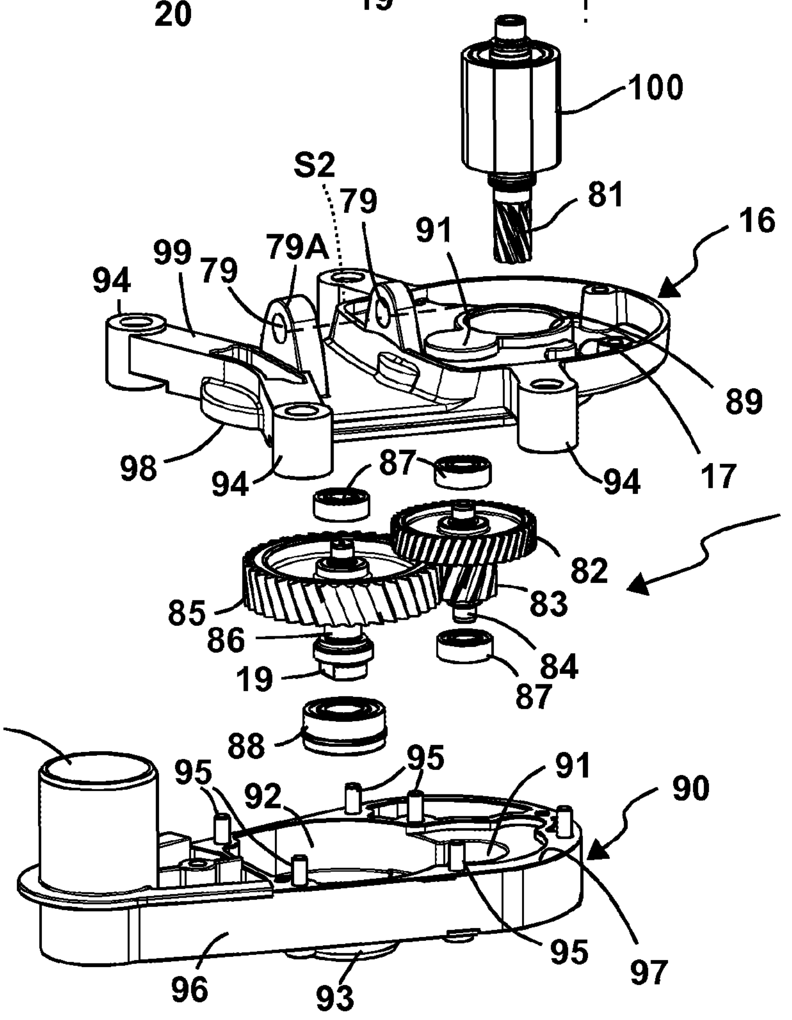
FIG. 7 An exploded view of a drive of the machining head of the sanding machine.

Starting from the base position B (FIG. 3), the machining head 11 can pivot between displacement positions A1 (FIG. 5) and A2 (FIG. 4). The displacement positions A1, A2 are expediently maximum positions, wherein tilting beyond these displacement positions A1, A2 is perfectly possible. If the suction hose 26 is to be displaced or deformed by a greater amount beyond the displacement positions A1 and A2, it expediently forms a springy stop for the displacement positions A1 and A2.

The base position B, together with the displacement positions A1 and A2 and possibly further displacement positions beyond these displacement positions or intermediate displacement positions between the displacement positions A1 and A2, forms a component of a basic working area BA of the hand-held machine tool 10. A pivoting beyond the displacement position A2, such that the machining side BS and an upper surface of the handle element 12 face towards a workpiece W, is perfectly possible. Then the machining head 12 is, by way of example, positioned in an additional working area ZA.

In the displacement positions A1, by way of example a machining plane E of the machining tool 20 runs approximately parallel to the longitudinal axis L, while in the displacement position A2 the machining plane E is approximately at right angles to the longitudinal axis L.

On the end region of the handle element 12 holding the machining head 11, so, in the present case, the channel body 33, a fork 50 is arranged, between the fork arms 51, 52 of which the machining head 11 is supported so it can pivot about the pivot axis S1. The fork arms 51, 52 on a retaining section 53 are designed like half shells, between which a mounting 54 or receptacle for the handle element 12, in particular its channel body 33, is formed.

The mounting 54 is, by way of example, configured between walls 55 of the fork arms 51, 52, by way of example as a round receptacle contour. Support structures 58 of the fork 50, which in particular may take the form of the screw bosses 57, serve as protection against rotation and/or displacement in relation to the longitudinal axis L of the handle element 12. Support structures 33A of the handle element 12, by way of example indentations provided on the outer periphery of the channel body 33, in particular grooves or longitudinal indentations, engage in the support structures 58, by way of example form-fit projections. The support structures 58, 33A act as a protection against rotation and/or displacement in relation to the longitudinal axis L of the handle element 12.

To relieve the strain on the cable 42 it is advantageous if a cable clamp 49 is provided on the fork 50. The cable clamp 49 has, by way of example, clamping pieces provided on each of the fork arms 51, 52, which when the fork arms 51, 52 are closed up to secure the holding element 12 simultaneously clamp the cable 42.

The fork arms 51, 52 are in particular reinforced on their arm sections 60A, 60B protruding in front of the retaining section 53, by way of example, by a ribbed structure 59.

Between the retaining section 53 and their free ends 61, the fork arms 51, 52 have angulations 62, 63 between the arm sections 60A, 60B. The angulations 62, 63 preferably serve to provide an optimal design of the space between the fork arms 51, 52 and the movement area below the fork arms 51, 52 for the machining head 11.

The angulations 62 run in opposite directions from each other in the sense of an expansion or extension of a distance between the ends 61. In this way, in particular in the area of the suction hose 26 and the suction connection 23 an enlarged movement area between the fork arms 51, 52 is available.

Figure 8:
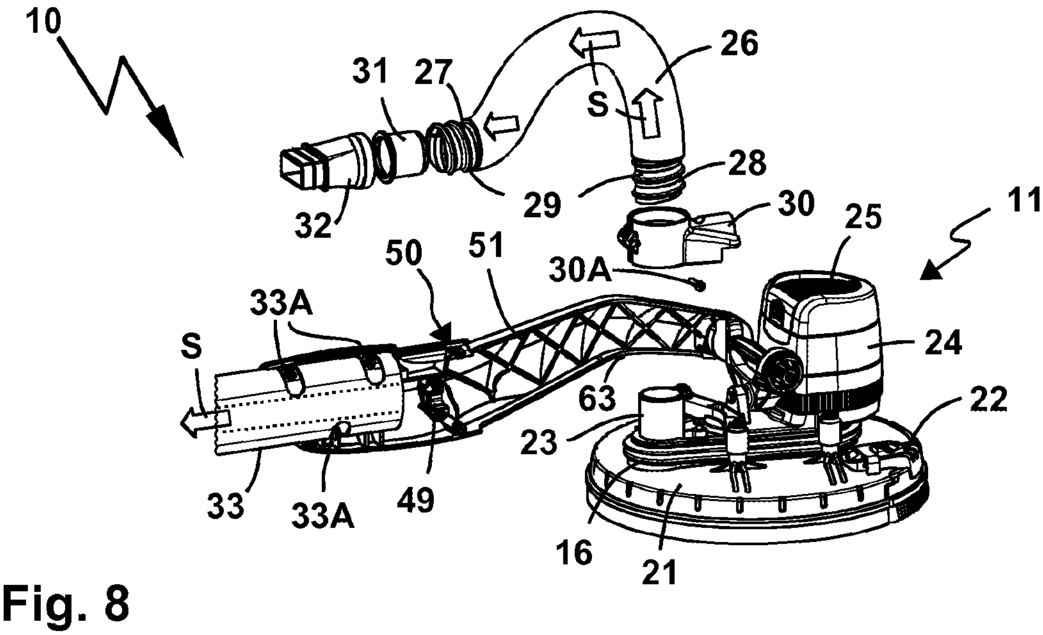
FIG. 8 The machining head of the sanding machine with a joint assembly in exploded view.
Figure 9:
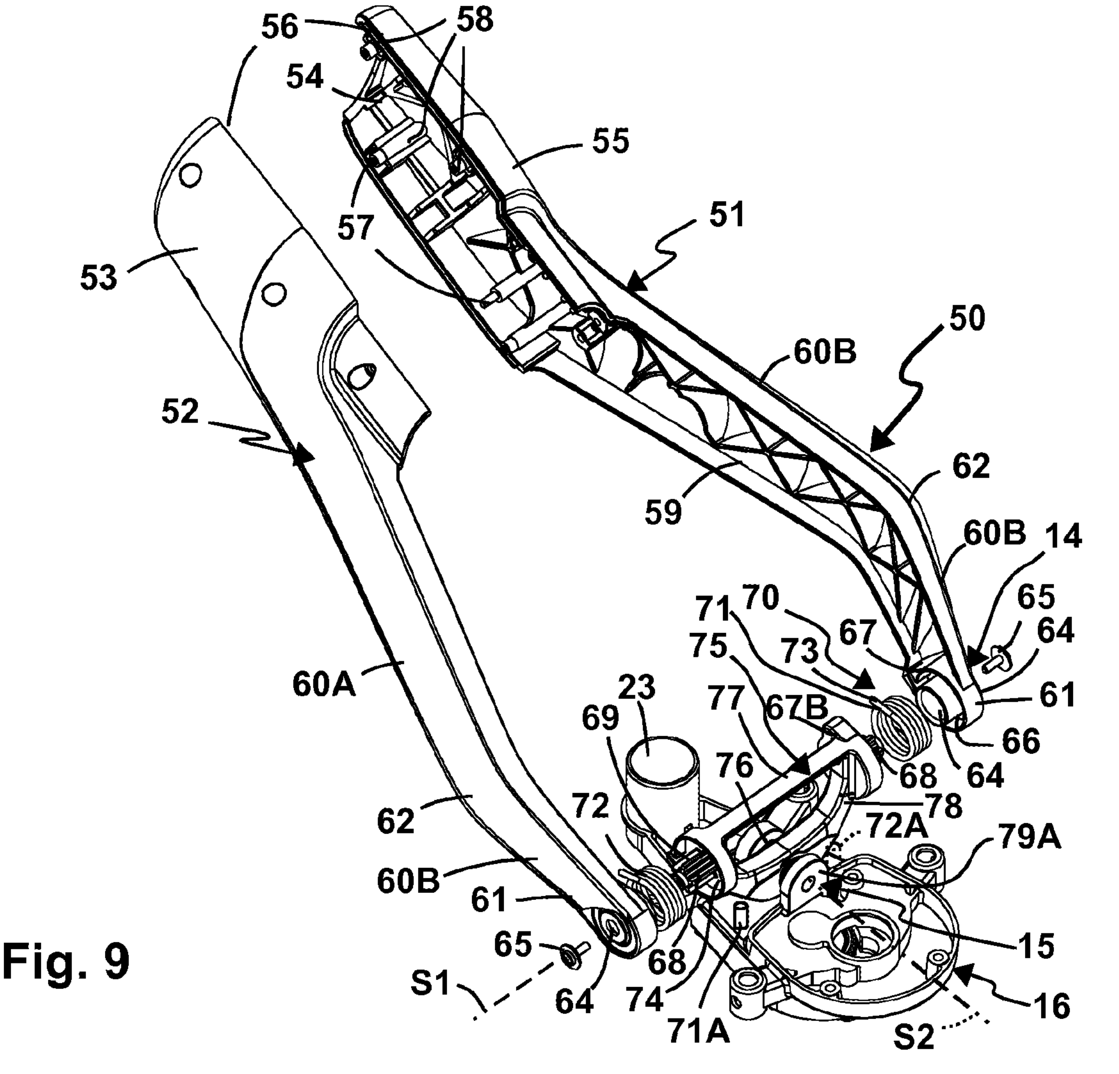
FIG. 9 The joint assembly of the sanding machine in exploded view.

The angulations 63 run in the same direction alongside one another, but starting from the handle element 12 and in relation to the longitudinal axis L in a direction away from the machining head 11 and at the free ends 61 on towards the machining head 11 or the longitudinal axis L, so that in particular for the displacement position A1, for instance according to FIG. 8, or a further pivoting beyond the displacement position A1, an area BW below the fork arms 51, 52 is available for an upper section of the machining head 11.

On the free ends 61, bearing elements 64 designed as bearing seats for bearing shaft parts 65 of the pivot bearings 14 are provided. The bearing shaft parts 65 which, for example, are designed in the form of bearing pins, are, by way of example, screws or similar other bolts, which pass through the bearing seats of the bearing elements 64 and penetrate bearing elements 68 designed as bearing projections.

The bearing elements 68 are provided on a bearing body 75 and protrude in front of a cross beam 77 of the bearing body 75. The bearing body 75, by way of example, is designed like a bearing shaft or bearing projection. By way of example, the bearing elements 68 are provided on the respective longitudinal end regions of the cross beam 77. A support bearing section 78, by way of example in the shape of an arc, extends between the cross beam 77 and the support body 16.

The support bearing section 78 forms a component of the pivot bearing 15 for pivoting about the pivot axis S2. The support bearing section 78 is passed through by a bearing shaft 76, which for its part is accommodated in bearing seats 79 of bearing blocks 79A, which protrude in front of the support body 16. The support bearing section 78 is arranged between the bearing blocks 79A. Obviously, in place of the bearing shaft 76, bearing pins could also be provided which, by way of example are accommodated, in particular rotatably, in bearing seats 79 passing through the bearing body 75. Consequently, the pivot axis S2 is thus closer to the support body 16 than the pivot axis S1, so that the machining head 11 can pivot about the pivot axis S2 positioned correspondingly close to the machining plane E. The machining head can conveniently follow the course of the workpiece surface O.

The machining head 11 pivots or oscillates freely in relation to the pivot axis S2, wherein the suction hose 26 and the line arrangement 41 dampen or brake the pivoting motion. However, it is important to note here that the suction connection 23 is close to the pivot axis S2 or is passed through by the pivot axis S2, which restricts the ability of the machining head 11 to pivot about the pivot axis S2 correspondingly less.

Conversely, in relation to the pivot axis S1, a positioning spring arrangement 70 is provided, which impinges on the machining head 11 in the base position B. The positioning spring arrangement 70 comprises positioning springs 71, 72 directly supported on the bearing elements 64, 68. The positioning spring 71 is associated with the fork arm 51, whereas the positioning spring 72 is associated with the fork arm 52. The positioning springs 71, 72 impinge on the machining head 11 in opposing directions, that is to say that one positioning spring 71 impinges on the machining head 11 by way of example in relation to the pivot axis S1 in the clockwise direction, whereas the other positioning spring 72 impinges on the machining head 11 in the anticlockwise direction. Consequently, the machining head 11 in respect of the pivot axis S1 is, so to speak, held in a central position, namely the base position B.

The positioning springs 71, 72 are supported by support arms 73 on support seats 67 of the bearing elements 64 and support seats 67B on the bearing elements 68. The positioning springs 71, 72 are, by way of example, leg springs, the longitudinal ends of which are configured as support arms 73.

The bearing elements 68 pass through the positioning springs 71, 72. On the outer periphery of the bearing elements 68 supporting contours 69, for example ribs, are expediently provided, on which the positioning springs 71, 72 are able to support themselves with their inner periphery. The ribs or supporting contours 69 expediently run parallel to the pivot axis S1. In this way, the movement of the positioning springs 71, 72 and the bearing elements 68 relative to one another is particularly good.

The positioning springs 71, 72 are expediently protected and enclosed. They are advantageously accommodated in bearing housings 66, 74, provided by the bearing elements 64, 68. By way of example, the bearing housings 66, 74 complement each other or fit inside each other like sleeves or plug-in elements, in order to fully enclose the positioning springs 71, 72. In this way, the bearing components and in particular also the positioning springs 71, 72 do not cause any soiling. In addition, the risk of injury from any protruding elements, such as for example the support arms 73, is low.

The support seats 67 are, by way of example, provided on the bearing housings 66 of the bearing elements 64. The support seats 67B are provided on the bearing housings 74 for the bearing elements 68.

It is clear that, in respect of the pivot axis S2 also a positioning spring arrangement can be provided which aligns the machining head 11 to the handle element 12 in respect of the pivot axis S2. There would be the possibility, by way of example, of leg springs, which are passed through by the bearing shaft 76 and which are on the one hand supported on bearing blocks 79A and on the other on, by way of example, the support bearing section 78. Further elastic positioning springs 71A, 72A designed, by way of example, as rubber buffers are shown schematically, supported outside the bearing 15 on fixed structures of on the one hand the joint assembly 13, by way of example the support bearing section 78, and on the other of the machining head 11, by way of example the support body 16 and which consequently bring about a positioning of the machining head 11 to the handle element 12 in relation to the pivot axis S2.

The drive motor 100 is arranged eccentrically in relation to the articulated-connection region 46 or in relation to the axis of rotation D of the tool holder 19. For the force transmission between an output 81 of the drive motor 100 the gear unit 80 is provided. The gear unit 80 comprises, by way of example, an arrangement of a plurality of toothed wheels, which bring about a change in speed, in particular a speed reduction, and/or a deflection of force from the output 81 to the tool holder 19. In present case a rotary transmission concept is provided for, i.e. the tool holder 19 rotates exclusively about the axis of rotation D. But an eccentric motion would be also be possible, by way of example eccentrically to the axis of rotation D, which is not shown in the drawing, however, and would represent another embodiment. Furthermore, a rotary motion of the tool holder 19 with an overlaid eccentric motion would also be perfectly possible, by way of example if a suitable transmission gear unit were present instead of or in addition to the gear unit 80. Finally, what is known as a hypercycloid motion mode of the tool holder 19 would also be possible using an appropriate gear unit.

The output 81 engages with a toothed wheel 82, which drives a shaft 84, with which the toothed wheel 82 has a torsionally rigid connection. A toothed wheel 83 also has a torsionally rigid connection with the shaft 84, which for its part engages with a drive wheel 85. The drive wheel 85 has a torsionally rigid arrangement on a shaft 86, at the free end region of which the tool holder 19 is arranged in a torsionally rigid manner.

The arrangement of the toothed wheels 82, 83, 85 brings about a speed reduction and also a force deflection, since the axis of rotation of the output 81 and the shaft 86 are not coaxial.

The shaft 84 is rotatably supported by bearings 87 on the one hand in relation to the support body 16 and on the other in relation to gear unit housing 90 connected to the support body 16. The support body 16 forms a cover for the gear unit housing 90. By way of example, on the support body 16 and the gear unit housing 90, bearing seats 91 for the bearing 87 designed in particular as a rolling bearing, are provided.

The shaft 86 is rotatably supported via a further bearing 87 in relation to the support body 16 and a bearing 88, which is accommodated in the bearing seat 92 of the bearing housing 90, in relation to the bearing housing 90. Consequently, the respective longitudinal end regions of the shafts 86, 84 are supported by pivot bearings on a protective housing.

The gear unit housing 90 has a plate 96, on which the bearing seats 91, 92 are provided. On its bottom side facing towards the tool holder 19, the bearing seat 92 is provided with a sealing edge 93 surrounding the bearing seat 92, so that the gear unit housing 90 encloses the gear unit 80 from the bottom up. The bearing 88 fits closely to the sealing edge 93 with, by way of example, an additional dust seal.

The top enclosing of the gear unit 80 is expediently achieved by the support body 16. The support body 16 has, by way of example, socket openings not visible in the drawing, in which pluggable projections or screw bosses 95 of the gear unit housing 90 engage from below. An edge region 97 of the gear unit housing 90 is, by way of example, provided with a seal, so that it fits closely on a sealing region 98, by way of example a sealing edge, of the support body 16.

The support body 16 thus contributes to the enclosing of the gear unit 80. From the top it encloses the gear unit housing 80 almost completely, apart from a motor receptacle 89, in which the drive motor 100 is accommodated. The support body 16 forms, by way of example, a housing part of the gear unit housing 80, in particular a housing shell.

Support projections 99, by way of example arms, protrude laterally from the support body 16, by way of example four support projections 99, on each of which pin seats or mounting seats 94 for accommodating mounting elements 94B for connection with the cover 21 protrude.

The suction connection 23 is also provided on the gear unit housing 90. The suction connection 23 protrudes laterally in front of the support body 16.

Similarly to the gear unit 80, the drive motor 100 is optimally protected from dust as explained in the following. The drive motor 100 has, by way of example, a rotor 101, which is incorporated in a stator 110. The drive motor 100 is a brushless, electronically commutated motor, which can be supplied with power by the power supply system 40.

The rotor 101 comprises a motor shaft 102, on which a laminated core 103 is arranged. Longitudinal ends of the motor shaft 102 protruding in front of the laminated core 103 are rotatably supported, in relation to the stator 110, by a motor bearing 104 and on the drive bearings 105, by way of example rolling bearings and/or slide bearings.

On a free end region of the motor shaft 102, e.g. on the motor bearing 104, a fan bracket 108 for holding a fan propeller 109 is provided.

A fan propeller 109 and the tool holder 19 are arranged on opposite sides of the drive motor 100.

The fan propeller 109 provides forced ventilation, e.g. air is so to speak sucked in through the inlet opening 25 by the fan propeller 109, flows through the stator 110 and emerges on the opposite side of the stator 110 to the fan propeller 109, in the region of the drive bearing 105, from the stator 110 and continues to flow to the air discharge region 18.

The stator 110 comprises a stator body 111, having a bearing seat 112 on a bearing cover 125A, in which the motor bearing 104 is accommodated. The motor shaft 102 passes through, by way of example, a through opening 113 of the stator 110 and is retained by an end region on the motor bearing 104. The bearing cover 125A is, by way of example, formed integrally with the stator body 111, but could also be designed as a component that is detachably connected to the stator body 111, like the bearing cover 125 described further on.

Apart from the through opening 113 a projection 114 is provided, which engages in a groove 106 on the rotor 101, by way of example on the laminated core 103. In this way, a certain labyrinth structure is created, which contributes to the tightness of the drive motor 100. The laminated core 103 is accommodated in a rotor receptacle 115 of the stator body 111.

The stator body 111 comprises, by way of example, a plastic material. Coils 121 of an exciter coil arrangement 120 are arranged on supports 116 of the stator body 111. A perimeter wall 117 of the stator 110, by way of example made from a plastic material, extends radially outwards on the supports 116.

A base of the supports 116 is formed, by way of example, by the material of a laminated core 111B, which is overmoulded with the plastic material to configure the stator body 111.

The exciter coil arrangement 120 has connections 122, 123 and 124, which are electrically connected with the conductors L1, L2, L3. The connections 122-124 are associated with phases P1, P2 and P3 of the exciter coil arrangement 120. The connections 122-124 are, by way of example, arranged on a front side of the stator body 111, in particular the perimeter wall 117.

The rotor receptacle 115 is sealed by a bearing cover 125, which can be integrated in the motor housing 24. The bearing cover 125 has, by way of example, a bottom wall 133, from which a fastening projection 126 protrudes for closing the rotor receptacle 115. The fastening projection 126 has a projection 127, which engages in a groove 107 of the rotor 101, namely on the laminated core 103. In this way a labyrinth seal or labyrinth seals 118 is or are created. The projections 114, 127 are, by way of example, circular projections, while the grooves 106, 107 are circular grooves. The grooves 106, 107 are, by way of example, provided on opposite front sides of the laminated core 103.

The bottom wall 133 and the fastening projection 126 seal the drive motor 100 on its front side with the motor bearing 105. A wall 17 of the gear unit housing 80 which, by way of example, can be a component of the support body 16, also forms a wall that closes off the drive motor 100 on the front side.

In the region of the fastening projection 126, a further receptacle 128 is arranged for a bearing seat element 130. The bearing seat element 130 has a bearing seat 131 for the drive bearing 105. The bearing seat element 130 is, by way of example, screwed into a thread 129 of the receptacle 128 or locks into the receptacle 128 by means of suitable snap contours. A gasket 132 or other sealing element is retained in the bearing seat element 130. The gasket 132 holds the drive bearing 105 in the bearing seat 131.

Between the supports 116 of the stator body 111 and, consequently, between the coils 121, cooling channels 119 are provided, via which the cooling air K is able to flow through the stator 110 and consequently the exciter coil arrangement 120. The cooling air K flows on a side of the drive motor 100 facing away from the tool holder 19 into the cooling channels 119 and on a side of the drive motor 100 facing towards the tool holder 19 out of the cooling channels 119. There it is deflected by a bottom wall 133 of the bearing cover 125 radially outwards and flows through a flow chamber 134 to a perimeter wall 135 of the cover 130, on which the air discharge region 18 is provided. By way of example, on the perimeter wall 135, ribs 136 are provided, between which gaps or outflow openings 137 are present, through which the cooling air K can flow out of the motor housing 24. The flow chamber 134 is provided between the perimeter wall 135 and the perimeter wall 117. Support ribs or support walls 138 advantageously extend between the perimeter wall 117 and the perimeter wall 135. On the support walls 138 conductor seats 139 for accommodating or retaining the conductors L1, L2 and L3 are advantageously provided.

The cable 42 is introduced via an inlet 140 on the perimeter wall 135 into the flow chamber 134. From the cable 42, the individual conductors L1, L2 and L3 are lead out and retained on the support walls 138, namely in the conductor seats 139, and connected with the connections 122-124 of the exciter coil arrangement 120.

Figure 11:
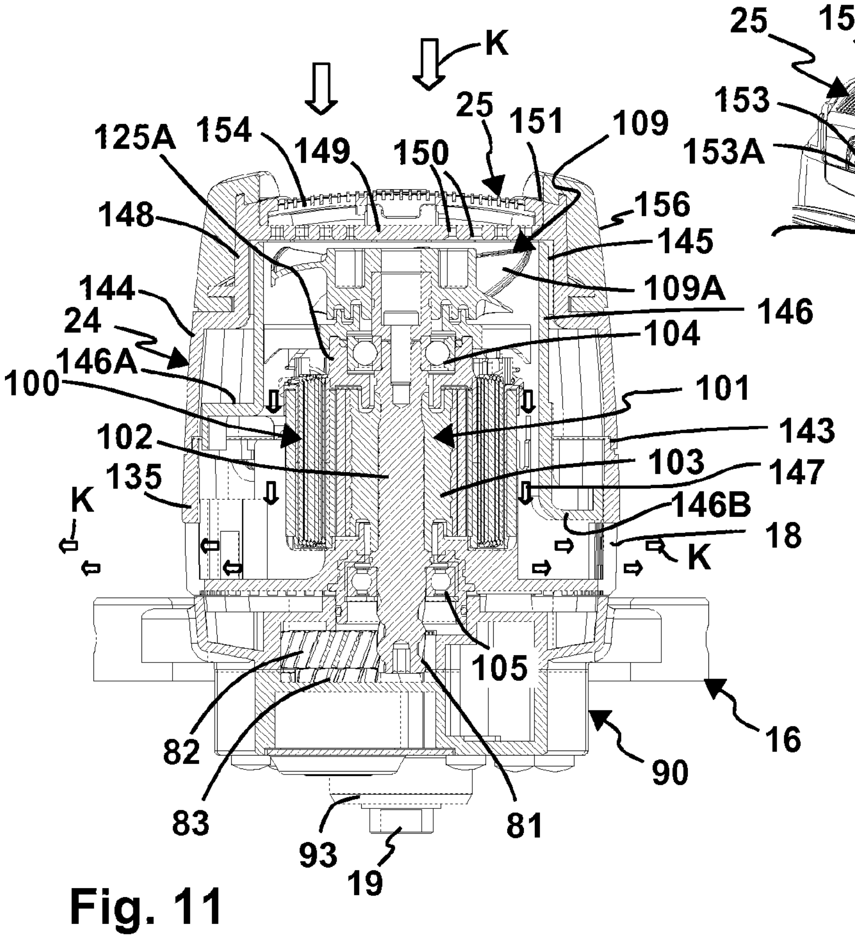
FIG. 11 A cross-section through the drive motor according to FIG. 6 approximately along a line of intersection A-A.

FIG. 11 illustrates how the bottom wall 133 runs above the support body 16, and the perimeter wall 135, so to speak, protrudes in front of the support body 16. The perimeter wall 135 is provided on its upper front side 141 with a sealing contour 142, which engages with a corresponding sealing contour 143 of a perimeter wall 144 of the motor housing 24. This results in a substantially dust-tight connection between the motor housing 24 and the bearing cover 125.

A flow housing or air routing body 145 is incorporated in the motor housing 24, extending around the drive motor 100. By way of example, the air routing body 145 has a wall 146, which delimits an air routing region 147 around the drive motor 100. The wall 146, by way of example, is designed as an air routing sleeve and/or perimeter wall and/or as a flow housing. In any event, via the air routing region 147, which can also have channels, the cooling air K flows along the outer periphery of the stator 110 and cools this. The wall 146 is, by way of example, in the region of the fan propeller 109 cylindrical and protrudes as far as the fan propeller 109.

The wall 146 thus helps the propeller blades 109A of the propeller 109 to, so to speak, push cooling air K particularly effectively towards the drive motor 100 or the stator 110 and the rotor 101.

The air routing body 145 has, on its longitudinal end region (in relation to a longitudinal axis of the motor shaft 102) remote from the fan propeller 109, front wall sections 146A and 146B extending radially in relation to the motor shaft 102 from the wall 146, which run above the air discharge region 18 and thus deflect the cooling air K radially outwards from the motor housing 24.

It is preferably provided that the drive motor 100 is electromagnetically screened. By way of example, the air routing body 145 can be designed as an electromagnetically screening housing. To this end, the air routing body 145, by way of example, comprises metal or has a metal component. But, in an advantageous embodiment of the invention, the motor housing 24 can also provide electromagnetic screening, by way of example being provided with a conductive protective film or protective layer.

The conductors L1-L3 in the cable 42 are advantageously run in an electromagnetic screening 177, in particular a braid. The screening 177 is preferably earthed. An overall contribution is made to the electromagnetic compatibility of the drive motor 100 and the hand-held machine tool if the screening 177 is conductively connected to the drive motor 100, by way of example with the stator 110, in particular the laminated core 111B. The screening 177 can, by way of example, be conductively applied to this by means of a spring.

In the region of the air inlet or inlet opening 25, the motor housing 24 has a projection wall 148 and a cover wall 149. The cover wall 149 covers, so to speak, the top of the motor housing 24, wherein however on the cover wall 149 air outlets or air inlets 150 for the cooling air K are present.

In the region of the cover wall 149, a recess 151 is provided for a filter element 152, which is inserted in the receptacle 151. By way of example, the receptacle 151 is delimited by the inner periphery of the projection wall 148. The filter element 152 has, by way of example, a filter fabric 154 or another close-meshed filter structure, which is arranged above the air inlets 150. Consequently, contaminants, by way of example dust or similar, contained in the cooling air K, are filtered out by the filter element 152.

The filter element 152 is expediently clicked into place on the motor housing 24 by means of catch means 153, by way of example comprising a springy catch or similar. The catch means 153 form component parts of a mounting 153A.

On an upper, free end region of the motor housing 24 a housing 155 is provided for a protection body 156. Whereas the motor housing 24 comprises a relatively hard plastic, so that it can deliver an optimum protective effect for the drive motor 100, the protection body 156 is by comparison soft or elastic. The protection body 156 is, by way of example, designed like a bracket. The protection body 156 efficiently cushions shocks that may impact on the machining head 11 and consequently damage, primarily, the drive motor 100.

It is preferred if the protection body 156 is flexurally flexible. The protection body 156 is in itself horseshoe-shaped or U-shaped, but can be curved. Consequently, it is, by way of example possible to, so to speak mount support seats 158 arranged on its free end regions on support projections 159 of the motor housing 24. It is advantageous if the protection body 156 has further support contours, for example a support projection 158A, that runs along a side edge and can be hooked into a corresponding, by way of example U-shaped, support receptacle 159A of the motor housing 24.

The drive motor 100 is provided with a protective circuit 160, which in situ, namely on the machining head 11, protects the drive motor 100 from overheating or other damage.

The protective circuit 160 has, by way of example, a disconnector 161. In principle, it would be possible to integrate the disconnector 161 directly in the motor housing or in any case the stator 110 of the drive motor 100. However, in the present case an installation-friendly, easily upgradable or exchangeable concept is selected, in which the disconnector 161 is arranged outside the stator 110, but in direct contact with it.

The disconnector 161 comprises a thermally operated switch or is formed by this, wherein when the stator 110 heats to above a predetermined temperature, the thermally operated switch moves to an isolating position, but otherwise adopts a connecting position. In the connecting position, the disconnector 161 connects conductor L1 with the connection 22 associated with a phase of the exciter coil arrangement 120, whereas in the isolating position it isolates the conductor L1 from connection 122 and consequently phase P1 of the exciter coil arrangement 120.

Figure 13:
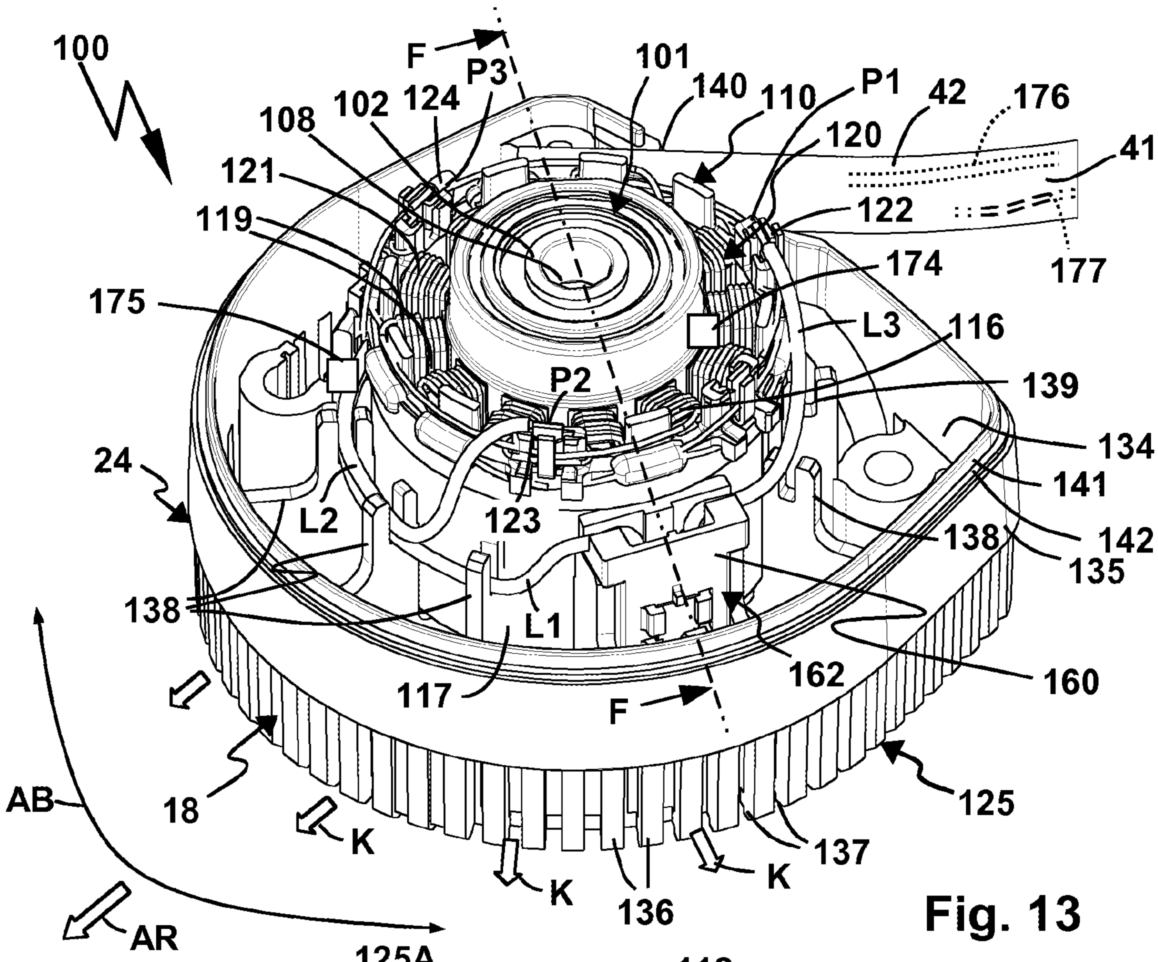
FIG. 13 A perspective view obliquely from above of a motor assembly of the machining head with the drive motor.
Figure 14:
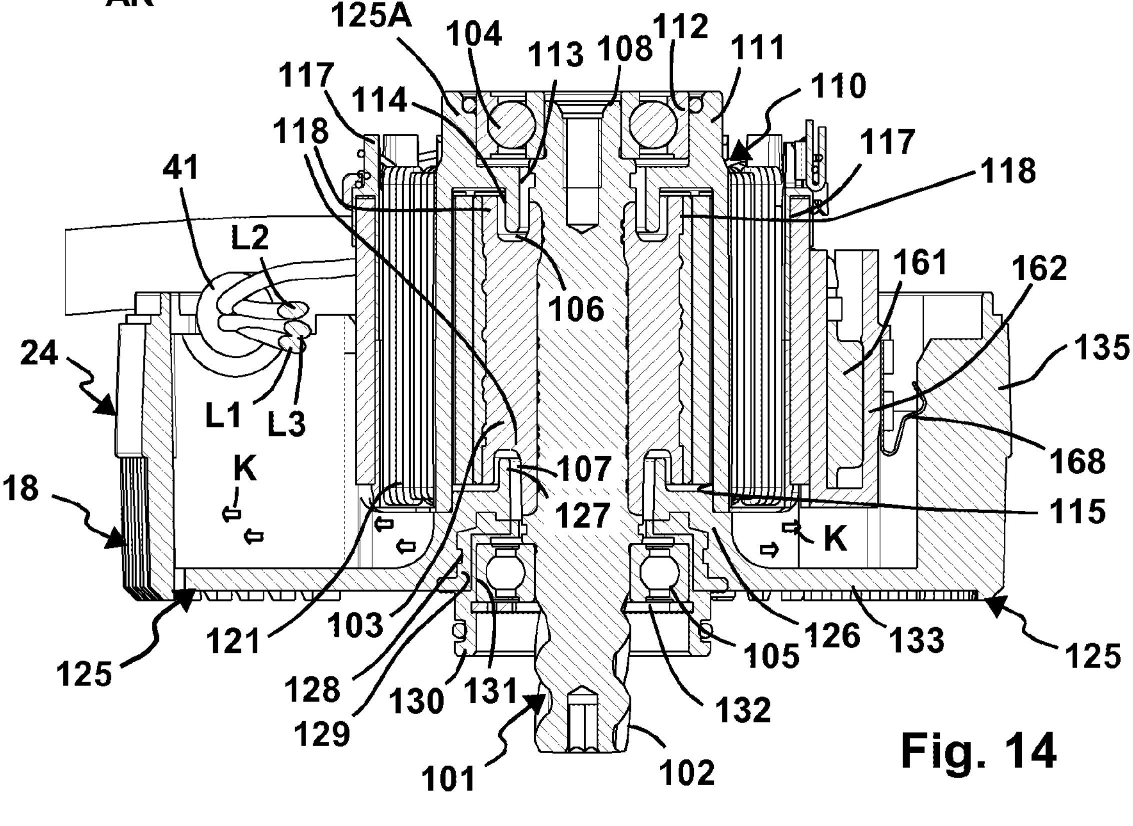
FIG. 14 A cross-sectional view approximately along a line of intersection F-F in FIG. 13.

The disconnector 161 is expediently arranged in a protective housing 162, having a housing part 63A and a housing part 63B. The protective housing 162 expediently fully encloses the disconnector 161. It would be possible, as shown in FIG. 13, for the protective housing 162 to be open on its upper surface, so that air is able to reach the disconnector 161. However, the protective housing 163 is preferably completely sealed, so that the disconnector 61 can respond particularly sensitively and rapidly to temperature changes, in particular excessively high temperatures.

The protective housing 162 delimits, by way of example, a receptacle 164, for example a chamber, in which the disconnector 161 is arranged. The housing parts 163A, 163B are, by way of example, interlocked, for which snap contours 165 are present.

The housing part 163B forms a thermal insulator, which protects the disconnector 161 from external heat influence on the drive motor 100, so that disconnector 161 is not abnormally operated due to such heat influence.

Conversely, the housing part 163A is thermally conductive so that heat coming from the stator 110 can operate the disconnector 161. An advantageous measure is represented by a heatsink 169 being arranged in addition, by way of example what is known as a heat conduction pad, which conducts the heat from the stator 110 in the direction of the protective housing 162 and consequently, as far as the disconnector 161.

The heatsink 169 preferably has a geometry and a surface area, which correspond with the geometry and surface area of a front face of the protective housing 162 facing towards the stator 110.

The heatsink 169 also smooths out unevennesses of the protective housing 162 and/or the stator 110, which advantageously improves the heat transmission from stator 110 to disconnector 161.

A further advantageous measure provides that a spring 168, thus a spring arrangement, is provided in order to load the disconnector 161 in the direction of the stator 110. The spring 168 is, by way of example, arranged on the housing part 163B, in particular its front wall.

Laterally on the protective housing 162, conductor openings 166 are provided for a section L1A of the conductor L1 and section L1B connected with the connection 122.

Figure 10:
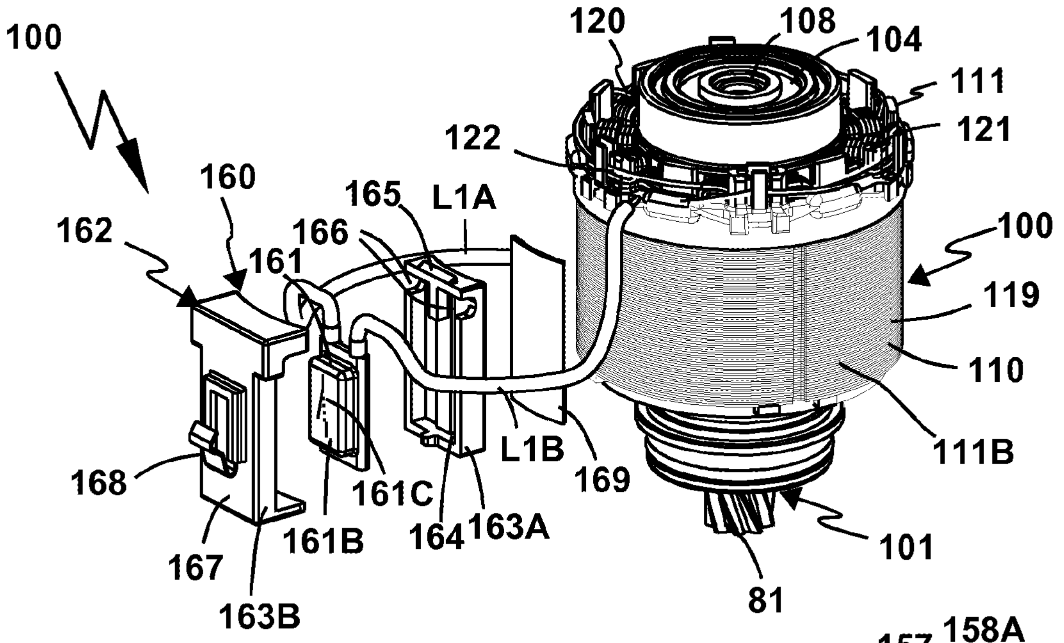
FIG. 10 A drive motor of the sanding machine with a protective circuit in exploded view.
Figure 12:
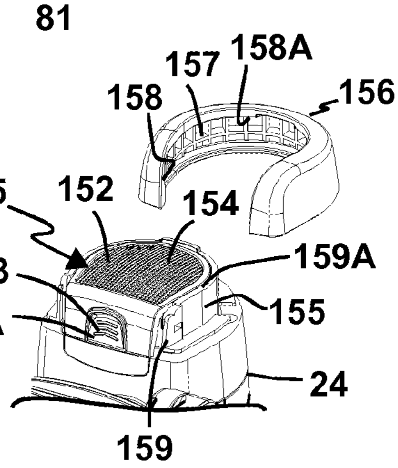
FIG. 12 A top view of a motor housing of the machining head, obliquely from behind.

The disconnector 161 advantageously also has a housing 161B enclosing this, in which its electromechanical components, in particular a bimetal strip 161C, electrical contacts and similar are housed with electrical insulation. The housing 161B is preferably dust-tight. The housing 161B has, by way of example, electrical contacts for connecting the conductor sections L1A and L1B. Under the effects of heat or cold, the bimetal strip 161C moves back and forth between the positions shown schematically in FIG. 10, wherein it makes or breaks an electrical connection.

If the disconnector 161 moves into its isolating position, no further current flows through the conductors L1. The current monitoring device 171 of the power supply system 40 is able to detect this and report it to the controller 170. The controller 170 then switches off the power supply system 40 completely, such that no further current flows via the conductors L1-L3. Consequently, the controller 170 detects decentrally, so to speak, a fault on the drive motor 100. As a safety measure, only the disconnector 161 is needed there. In this way, by way of example, data transmission lines are spared, which would otherwise have to be run from the machining head 11 via the handle element 12 to the controller 140. The controller 170 preferably works with sensors, e.g. without rotation angle information coming from the drive motor 100 from a rotation angle sensor arranged there.

Obviously, it is essentially possible for, by way of example, a rotation angle sensor 174 to be arranged on the drive motor 100, which detects the respective rotation angle position or speed of the rotor 101 and reports this via a data line 176, preferably running on and/or in the handle element 12 (shown schematically in FIG. 13), to the controller 170. In this way, it is also possible for the controller 170 to evaluate a respective rotation angle position of the rotor 101 and on the basis of this at least one piece of rotation angle information to supply power to the exciter coil arrangement.

Obviously, other or further disconnectors may be advantageous on the drive motor 100, thus, for example a power switch 175 detecting a current flow on the conductor L2, which in the event of a current flow above a predetermined value isolates the conductor L2 from the phase P2. It would be perfectly possible for the power switch 175 to be arranged in series with the disconnector 161, by way of example on the conductor L1.

In the exemplary embodiment according to FIGS. 1-15, the grip rod or the handle element 12 is in a single part, meaning that, by way of example, even the component parts of the channel body 33, 36 can be an overall continuous tubular body.

Figure 16:
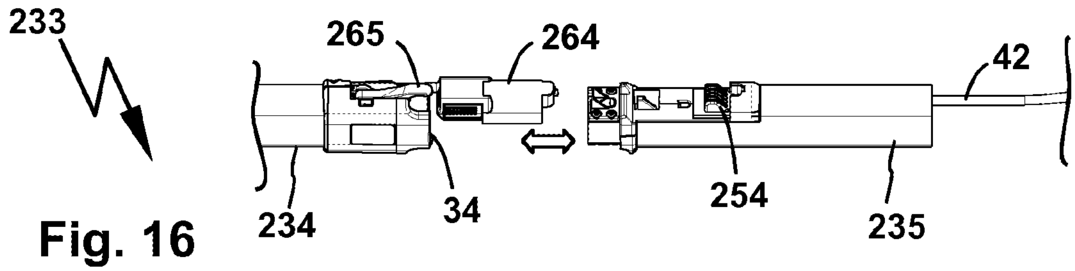
FIG. 16 Grip rod parts of a grip rod for the sanding machine in an as-yet unconnected state, in a perspective view obliquely from above.
Figure 17:
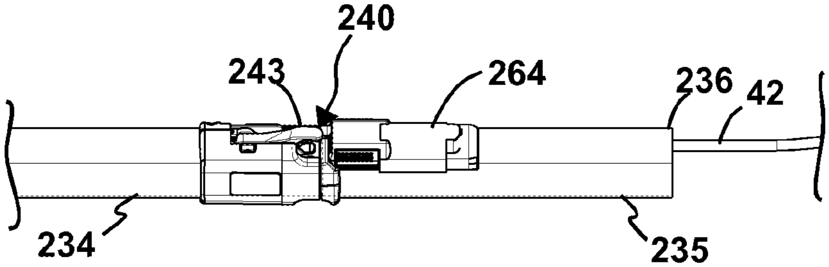
FIG. 17 The arrangement according to FIG. 16, but in the connected state.
Figure 18:
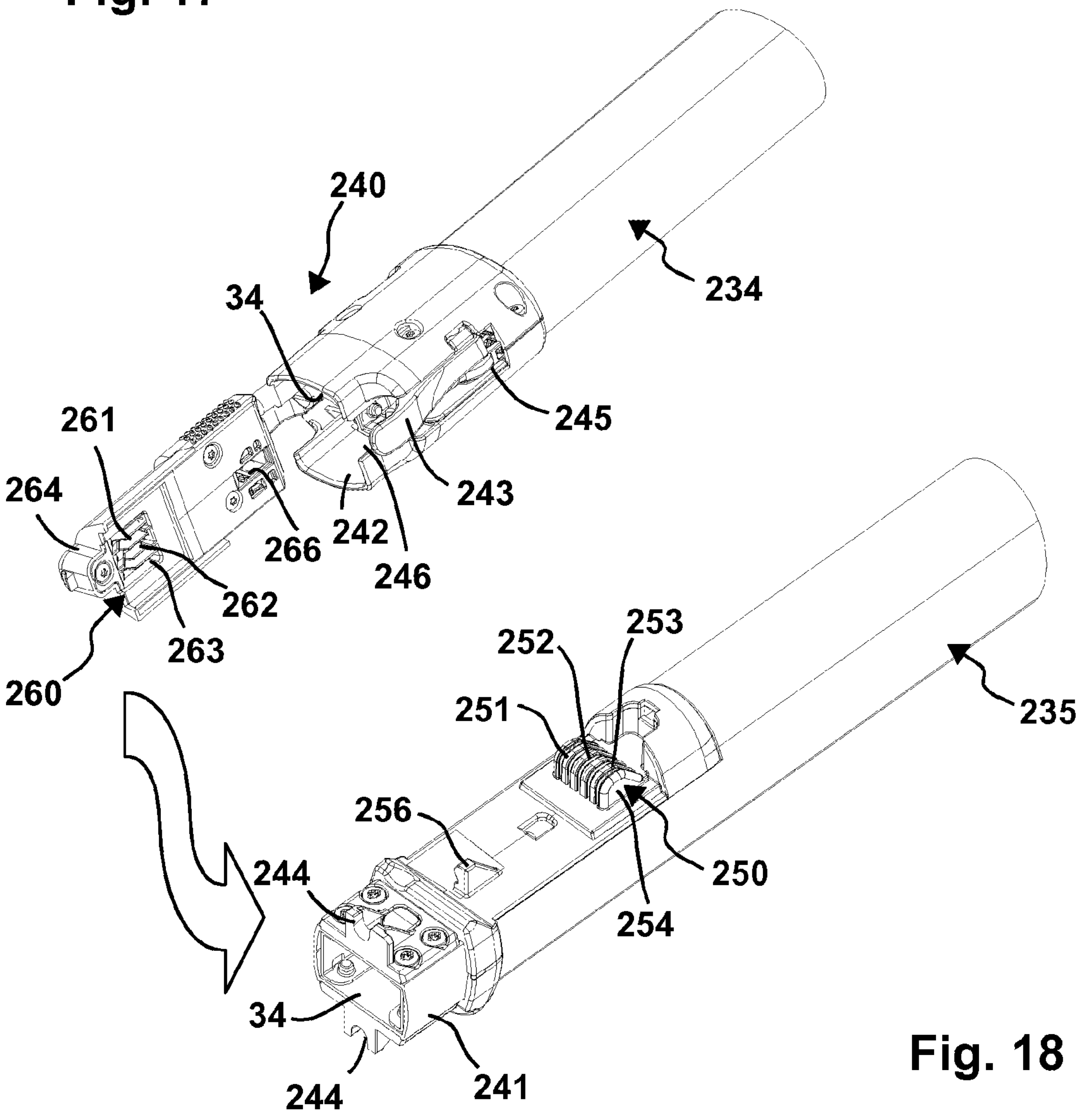
FIG. 18 Perspective detailed views of the grip rod parts shown in FIGS. 16 and 17.

But a multi-part handle element is also perfectly possible, as is clear from FIGS. 16-18. By way of example, instead of the channel body 33, a two-part channel body 233 can be provided. The channel body 233 has, by way of example, segments 234, 235. The segments 234, 235 can, by way of example, be separated from one another (FIG. 16).

The flow channel 34 passes through the segments 234, 235. On an end region 236 of the segment 35, by way of example, the cable 42 is led out of the channel body 233.

The cable 42 comprises the conductors L1-L3, that is to say a total of three current-carrying conductors, leading along the channel body 233 as far as the power supply system 40 and which can be detachably connected to one another at the separation point between the segments 234 and 235.

The segments 234, 235 can be detachably connected to one another, so that they can be brought together from the separated position shown in FIG. 16 to a connected position shown in FIG. 17. A connection device 240 serves for detachable connection of the segments 234, 235. The connection device 240 comprises, by way of example, a connection projection 241 provided on segment 235, which, by way of example, can be butt-jointed with a connection projection 242 on segment 234. This results in a continuous flow channel 34. The flow channel 34 passes through the socket projection 241 and the socket opening 242.

Alternatively, or additionally, a plug connection is also possible, meaning that, by way of example, the connection projection 241 has a socket projection and the connection projection 242 a socket opening, which can be plugged together.

The connection device 240 further comprises support means in the form of retainers 243 movably supported on the segment 234, which can be brought into engagement with retaining recesses or retaining projections 244 on the segment 235. The retainers 243 are, by way of example supported on pivot bearings 245, such that they can be pivoted away from the retaining projections 244 and, consequently, out of engagement with these.

It is preferred if the retaining projections 244 are able to engage in recesses or other retaining recesses on the segment 234. This results in an additional form fit between the segments 234, 235.

Electrical contact arrangements 250, 260 which can be detachably connected to one another provide the electrical connection between the segments 234, 235. The contact arrangement 250 comprises, by way of example, contacts 251, 252, 253, associated with and connected to the conductors L1-L3. By way of example, the contacts 251-253 are arranged on a contact carrier 254, in particular in indentations, or otherwise mechanically protected. The contact carrier 254, by way of example, is designed as a projection or like a comb.

The contact arrangement 260 comprises corresponding contacts 261-263, which are similarly associated with the lines or conductors L1-L3. The contact arrangement 260 is arranged on a contact carrier 264, which is supported by means of a pivot bearing 265 so that it can pivot on segment 234. By way of example, the contact carrier 264 forms a single piece with the retainer 243 of the segment 234 as a single piece or is movably coupled thereto. Consequently, the contacts 261-263 can be pivoted away from or towards the contacts 251-254 for electrical isolation from or connection to this.

For additional security of this connection between segments 234, 235 or contacts 261-263 and contacts 251-254, a retaining recess 266 on the contact carrier 264 can be brought into engagement with a retaining projection 256 on the segment 235.

The connection between the segments 234 and 235 can be secured through additional catch means, screw means or similar.

In this regard, the advantage will be recognised of the safety concept that involves the protective circuit 160 and the disconnector 161, because the contact arrangements 250 and 260 need a total of just 3 contact pairs, namely for conductors L1, L2 and L3.

According to a concept that is not just advantageous for the specific exemplary embodiment, it is provided that an inlet opening for a cooling air flow and machining side BS having a tool holder (in the present case 19) are arranged on opposing sides, in particular front faces, of a motor housing (here 25) or of a machine housing.

An outflow direction for the cooling air flow K runs expediently perpendicularly to the machining plane E.

The invention claimed is:

1. A hand-held machine tool comprising a rod-shaped handle element for a user to grip and a machining head, which is movably mounted on the handle element by means of a joint assembly, said machining head having an electric drive motor for driving a tool holder provided for holding a machining tool, and a speed-reducing gear unit between the drive motor and the tool holder, said gear unit being designed to achieve a reduction in speed of an output of the drive motor relative to a speed of the tool holder, wherein the drive motor is a brushless motor and a power supply system for the drive motor is arranged at a distance from the drive motor on the handle element, the power supply system being connected to the drive motor by means of a line arrangement, wherein the drive motor has a stator with an exciter coil arrangement and a rotor with a motor shaft, having a drive for driving the tool holder, wherein a fan propeller is connected in a torsionally-rigid manner or rotatably coupled to the motor shaft, wherein the motor shaft, on its longitudinal end regions, is rotatably supported by a drive bearing arranged in the area of the output and a motor bearing arranged at the other longitudinal end region, so that it can rotate with respect to the stator, wherein the exciter coil arrangement is arranged between the fan propeller and the output of the motor shaft and the fan propeller is designed to generate a cooling air flow for the drive motor flowing from the fan propeller to the output.

2. The hand-held machine tool according to claim 1, wherein the power supply system is arranged on or directly alongside a handle region for gripping the handle element by an operator and/or wherein the power supply system is arranged in a housing.

3. The hand-held machine tool according to claim 1, wherein the gear unit comprises a gear unit or an eccentric gear unit generating a hypercycloid motion of the tool holder.

4. The hand-held machine tool according to claim 1, wherein the line arrangement for each phase of an exciter coil arrangement of the drive motor comprises in each case a conductor or exclusively one conductor.

5. The hand-held machine tool according to claim 1, wherein the conductor of the line arrangement for supplying the phases of the drive motor individually or as a whole are arranged in at least one electromagnetically-screening screening device.

6. The hand-held machine tool according to claim 1, wherein the line arrangement comprises conductors provided exclusively for supplying power to the drive motor and/or between the drive motor and the power supply system, no data line exclusively for data transmission and not for supplying power to the drive motor runs to a sensor arranged on the drive motor.

7. The hand-held machine tool according to claim 1, wherein the distance between the machining head and the power supply system is at least two or three times a diameter of the machining head and/or a length of the power supply system or its housing and/or wherein it has at least one energy storage device connection for an electrical energy storage device, and/or a connection device for connection to an electrical energy supply network.

8. The hand-held machine tool according to claim 1, wherein an axis of rotation of the output of the drive motor and an axis of rotation of the tool holder are parallel to one another or are at an angle of a maximum of 30° to one another and/or wherein the drive motor does not protrude beyond a machining surface of the machining tool and/or beyond a cover of the machining head for the machining tool transversally to the axis of rotation of the tool holder.

9. The hand-held machine tool according to claim 1, wherein the drive motor is arranged outside a centre of gravity or centre of the machining head and/or alongside a pivot axis of the joint assembly on the machining head.

10. The hand-held machine tool according to claim 1, wherein the drive motor is arranged in a motor housing, on which at least one protection body is provided for damping a mechanical shock impacting on the motor housing and/or at least one hoop guard can be arranged to protect the motor housing from mechanical loading.

11. The hand-held machine tool according to claim 10, wherein the protection body is arranged on an area of the motor housing facing away from the machining head and/or has a circular design and/or comprises an elastic material, and/or is a plug-in component detachable from the motor housing, which can be plugged into a socket opening of the motor housing.

12. The hand-held machine tool according to claim 1, wherein the handle element comprises a grip rod or is rod-shaped.

13. The hand-held machine tool according to claim 1, wherein the power supply system and the machining head are arranged on opposing end regions of the handle element.

14. The hand-held machine tool according to claim 1, wherein a line arrangement connecting the drive motor with the power supply system is run and/or arranged along the handle element.

15. The hand-held machine tool according to claim 14, wherein the line arrangement comprises conductors exclusively provided for supplying power to the drive motor.

16. The hand-held machine tool according to claim 1, wherein, between the power supply system and the drive motor, no data line is provided or runs that serves exclusively for data transmission and not for supplying power to the drive motor.

17. A hand-held machine tool comprising a rod-shaped handle element for a user to grip and a machining head, which is movably mounted on the handle element by means of a joint assembly, said machining head having an electric drive motor for driving a tool holder provided for holding a machining tool, and a speed-reducing gear unit between the drive motor and the tool holder, said gear unit being designed to achieve a reduction in speed of an output of the drive motor relative to a speed of the tool holder, wherein the drive motor is a brushless motor and a power supply system for the drive motor is arranged at a distance from the drive motor on the handle element, the power supply system being connected to the drive motor by means of a line arrangement, wherein the power supply system for supplying power to the drive motor is connected with the drive motor via a line arrangement and, on the drive motor, a protective circuit is arranged with at least one electrical disconnector for isolating a connection between at least one electrical conductor of the line arrangement and a phase that can be supplied with current via this conductor of an exciter coil arrangement of the drive motor.

18. The hand-held machine tool according to claim 17, wherein the power supply system and the drive motor in each case have at least one fan, and/or, on a motor shaft of the drive motor, a fan propeller is arranged in a torsionally-rigid manner.

19. The hand-held machine tool according to claim 17, wherein the drive motor is arranged in an electromagnetically screening housing formed by the motor housing or arranged in the motor housing and/or an air routing body arranged in the motor housing for guiding cooling air through the drive motor or past the drive motor and/or connected with a screening electromagnetically screening one of the conductors.

20. The hand-held machine tool according to claim 17, wherein the at least one disconnector comprises or forms a thermally operable switch, which isolates the conductor from the phase associated with it, as a function of a predetermined temperature.

21. The hand-held machine tool according to claim 17, wherein the at least one disconnector comprises or forms an electrically operable switch, which in the event of exceeding a predefined voltage and/or a predefined current flow, isolates the conductor from its associated phase.

22. The hand-held machine tool according to claim 17, wherein the power supply system has a current monitoring device for detecting a current flow on the conductor connected with at least one disconnector.

23. The hand-held machine tool according to claim 17, wherein the power supply system is designed for disconnecting further conductors as a function of a current flow over the conductor connected with at least one disconnector.

24. A hand-held sanding machine comprising:

a rod-shaped handle element for a user to grip;

a joint assembly disposed at a distal end of the rod-shaped handle element;

a sanding head movably mounted on the handle element via the joint assembly, the sanding head comprising a tool holder, a sanding plate attached to the tool holder and a sanding disk or a sanding sheet fastened to the sanding plate;

a brushless electric drive motor supported on the sanding head for driving the tool holder;

a speed-reducing gear unit between the drive motor and the tool holder, the gear unit being configured to achieve a reduction in speed of an output of the drive motor relative to a speed of the tool holder;

a power supply system for the drive motor arranged at a distance from the drive motor on the handle element; and a line arrangement connecting the power supply system to drive motor; wherein the drive motor has a stator with an exciter coil arrangement and a rotor with a motor shaft, having a drive for driving the tool holder, wherein a fan propeller is connected in a torsionally-rigid manner or rotatably coupled to the motor shaft, wherein the motor shaft, on its longitudinal end regions, is rotatably supported by a drive bearing arranged in the area of the output and a motor bearing arranged at the other longitudinal end retion, so that it can rotate with respect to the stator; and wherein the exciter coil arrangement is arranged between the fan propeller and the output of the motor shaft and the fan propeller is designed to generate a cooling air flow for the drive motor flowing from the fan propeller to the output.

25. A hand-held machine tool comprising:

a rod-shaped handle element for a user to grip;

a joint assembly disposed at a distal end of the rod-shaped handle element;

a machining head movably mounted on the handle element via the joint assembly, the machining head comprising a machining tool, a tool holder holding the machining tool, a cover defining an area surrounding the machining tool and a suction connection provided on the cover through which dust, dirt or chips can be extracted from the area surrounding the machining tool;

a suction flow channel extending from the suction connection of the machining head along the rod-shaped handle element to a proximal end of the rod-shaped handle element opposite the machining head;

a brushless electric drive motor supported on the machining head for driving the tool holder;

a speed-reducing gear unit between the drive motor and the tool holder, the gear unit being configured to achieve a reduction in speed of an output of the drive motor relative to a speed of the tool holder;

a power supply system for the drive motor arranged at a distance from the drive motor on the handle element; and a line arrangement connecting the power supply system to drive motor; wherein the drive motor has a stator with an exciter coil arrangement and a rotor with a motor shaft, having a drive for driving the tool holder, wherein a fan propeller is connected in a torsionally-rigid manner or rotatably coupled to the motor shaft, wherein the motor shaft, on its longitudinal end regions, is rotatably supported by a drive bearing arranged in the area of the output and a motor bearing arranged at the other longitudinal end retion, so that it can rotate with respect to the stator; and wherein the exciter coil arrangement is arranged between the fan propeller and the output of the motor shaft and the fan propeller is designed to generate a cooling air flow for the drive motor flowing from the fan propeller to the output.

* * * * *